US012699310B2

(12) United States Patent
Wakabayashi et al.

(10) Patent No.: US 12,699,310 B2
(45) Date of Patent: Aug. 4, 2026

(54) VIBRATION GENERATION DEVICE, VIBRATION REDUCTION DEVICE, AND ELECTRONIC APPARATUS

(71) Applicant: SEIKO EPSON CORPORATION, Tokyo (JP)

(72) Inventors: Shinichi Wakabayashi, Suwa (JP); Tatsuya Takahashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 678 days.

(21) Appl. No.: 18/175,611

(22) Filed: Feb. 28, 2023

(65) Prior Publication Data

US 2023/0314917 A1 Oct. 5, 2023

(30) Foreign Application Priority Data

Feb. 28, 2022 (JP) ................................. 2022-029117

(51) Int. Cl.
*G03B 21/14* (2006.01)
*H02K 33/18* (2006.01)
(52) U.S. Cl.
CPC ........... *G03B 21/142* (2013.01); *H02K 33/18* (2013.01)
(58) Field of Classification Search
CPC ....... G03B 21/142; H02K 33/18; H02K 33/16
See application file for complete search history.

(56) References Cited

U.S. PATENT DOCUMENTS

| | | | |
|---|---|---|---|
| 2010/0204881 A1 | 8/2010 | Muragishi et al. | |
| 2015/0098130 A1* | 4/2015 | Terajima .............. | H04N 23/685 |
| | | | 359/557 |
| 2019/0015189 A1 | 1/2019 | Klausen | |
| 2019/0151894 A1 | 5/2019 | Takahashi et al. | |
| 2019/0305660 A1 | 10/2019 | Tsuchihashi et al. | |
| 2019/0314860 A1 | 10/2019 | Katada | |
| 2021/0218324 A1 | 7/2021 | Hashimoto et al. | |
| 2023/0012117 A1* | 1/2023 | Hatano .................... | H02K 5/04 |
| 2023/0147348 A1 | 5/2023 | Irie et al. | |

FOREIGN PATENT DOCUMENTS

| | | | | |
|---|---|---|---|---|
| JP | H11226500 | * | 8/1999 | |
| JP | 2001-304332 A | | 10/2001 | |
| JP | 2001-352742 A | | 12/2001 | |
| JP | 2003-305409 A | | 10/2003 | |
| JP | 2007285377 A | | 11/2007 | |
| JP | 2012237448 A | | 12/2012 | |
| JP | 2013-247810 A | | 12/2013 | |
| JP | 2018-074781 A | | 5/2018 | |
| JP | 2019-097227 A | | 6/2019 | |
| JP | 2019-180147 A | | 10/2019 | |
| JP | 2021109165 A | | 8/2021 | |
| WO | WO-2015146805 A1 | * | 10/2015 | ........... G03B 21/145 |
| WO | WO2021/200423 | | 10/2021 | |

\* cited by examiner

*Primary Examiner* — Ryan D Howard
(74) *Attorney, Agent, or Firm* — Dority & Manning, P.A.

(57) ABSTRACT

A vibration generation device includes: a base configured to transmit vibration to an object; a pendulum supported by the base swingably around a rotation axis; a first induction unit including a magnet, provided at an opposite-side end portion of the pendulum from the rotation axis, and configured to induce swing of the pendulum; and a first driving unit including a coil and configured to apply a driving force to the pendulum. The coil of the first driving unit faces the magnet of the first induction unit in a non-contact manner.

20 Claims, 20 Drawing Sheets

FIG. 16

VIBRATION GENERATION DEVICE, VIBRATION REDUCTION DEVICE, AND ELECTRONIC APPARATUS

The present application is based on, and claims priority from JP Application Serial Number 2022-029117, filed Feb. 28, 2022, the disclosure of which is hereby incorporated by reference herein in its entirety.

BACKGROUND

1. Technical Field

The present disclosure relates to a vibration generation device, a vibration reduction device, and an electronic apparatus.

2. Related Art

In the related art, for example, as disclosed in JP-A-2021-109165, a vibration actuator that implements a vibration function of an electronic apparatus is known.

The vibration actuator disclosed in JP-A-2021-109165 includes a fixed body and a movable body that is supported by the fixed body to swing around a shaft portion provided at the fixed body. The movable body is movably supported by the fixed body via a magnetic spring implemented based on an attractive force of a magnet. The movable body includes a core that is a magnetic body and a coil that is wound around the core. Currents of different frequencies flow through the coil, and the movable body moves around the shaft portion which is inserted through a through hole of the core. A flexible substrate that supplies electric power to the coil is provided at one end portion of the core.

The fixed body is formed by combining a base plate and a case. The fixed body includes the magnet and a buffer portion. The magnet can move the movable body in cooperation with the coil of the movable body. A free end of the movable body that vibrates comes into contact with the buffer portion. Accordingly, vibration of the movable body can be transmitted to a housing of the vibration actuator, and the buffer portion can generate large vibration.

However, in the vibration actuator disclosed in JP-A-2021-109165, the magnet is provided at the fixed body, and the coil is wound around the core constituting the movable body. Further, the flexible substrate provided at the core vibrates together with the movable body. With such a configuration, the vibration of the vibration actuator may adversely affect coupling of a wiring for supplying the electric power to the coil in a long term.

Therefore, there is a demand for a vibration generation device having improved reliability.

SUMMARY

A vibration generation device according to a first aspect of the present disclosure includes: a base configured to transmit vibration to an object; a pendulum supported by the base swingably around a rotation axis; a first induction unit including a magnet, provided at an opposite-side end portion of the pendulum from the rotation axis, and configured to induce swing of the pendulum; and a first driving unit including a coil and configured to apply a driving force to the pendulum. The coil of the first driving unit faces the magnet of the first induction unit in a non-contact manner.

A vibration reduction device according to a second aspect of the present disclosure includes: the vibration generation device according to the first aspect; a detection unit configured to detect vibration; and an operation control unit configured to cause the vibration generation device to generate vibration opposite in phase from the vibration detected by the detection unit.

An electronic apparatus according to a third aspect of the present disclosure includes the vibration reduction device according to the second aspect.

BRIEF DESCRIPTION OF THE DRAWINGS

FIG. 16 is a view showing a vibration generation device according to a third modification of the second embodiment.

DESCRIPTION OF EXEMPLARY EMBODIMENTS

First Embodiment

Hereinafter, a first embodiment according to the present disclosure will be described with reference to the drawings.

Schematic Configuration of Projector

Figure 1:
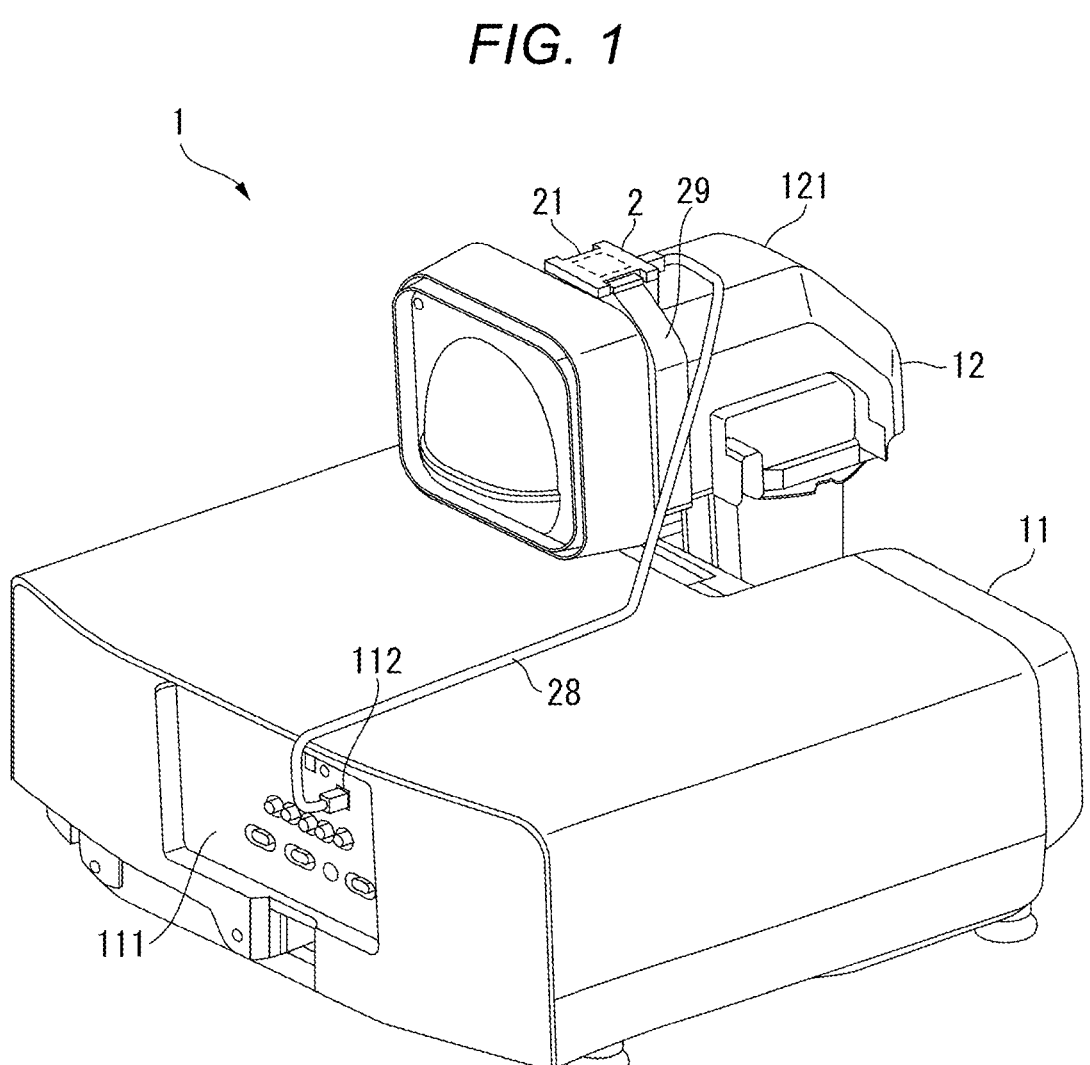
FIG. 1 is a perspective view showing a projector according to a first embodiment.

FIG. 1 is a perspective view showing a projector 1 according to the embodiment.

The projector 1 according to the embodiment is an electronic apparatus that modulates a light emitted from a light source to form an image light corresponding to image information, and enlarges and projects the formed image light onto a projection surface. As shown in FIG. 1, the projector 1 includes an exterior housing 11, a projection optical device 12, and a vibration reduction device 2. Although not shown, the projector 1 further includes the light source, a light modulation device, a power supply device, a cooling device, and a control device.

The light modulation device modulates the light emitted from the light source to form the image light corresponding to the image information.

The power supply device supplies electric power to electronic components of the projector 1.

The cooling device cools a cooling target provided inside the projector 1.

The control device controls operations of the projector 1.

Configuration of Exterior Housing

The exterior housing 11 constitutes an exterior of the projector 1, and houses the light source, the light modulation device, the power supply device, the cooling device, and the control device described above therein. The exterior housing 11 is formed in a substantially rectangular parallelepiped shape.

The exterior housing 11 includes a coupling terminal 112 to which a cable 28 of the vibration reduction device 2 to be described later is coupled in a surface 111 in a projection direction of an image projected by the projection optical device 12. The coupling terminal 112 is, for example, a universal serial bus (USB) terminal, and is used to supply the electric power to the vibration reduction device 2.

Configuration of Projection Optical Device

The projection optical device 12 projects the image light formed by the light modulation device described above onto the projection surface. In the embodiment, the projection optical device 12 is detachably attached to the exterior housing 11. That is, the projection optical device 12 is replaceable.

The projection optical device 12 shown in FIG. 1 sequentially bends a traveling direction of the image light incident on the projection optical device 12 in two stages, and projects the image light in a direction opposite from an incident direction of the image light in the projection optical device 12. That is, the projection optical device 12 has a substantially U-shape rotated by 90° counterclockwise when viewed from a direction orthogonal to a direction coupling the surface 111 in the projection direction and a surface on a side opposite from the surface 111 in the projection direction.

The projection optical device 12 includes a lens barrel 121, and further includes a plurality of lenses and a plurality of reflection members (not shown) provided in the lens barrel 121.

Configuration of Vibration Reduction Device

The vibration reduction device 2 is attached to a vibration reduction target, and reduces vibration of the vibration reduction target by generating vibration opposite in phase from the vibration acting on the vibration reduction target. In the embodiment, the vibration reduction device 2 is provided at the lens barrel 121 and reduces vibration acting on the lens barrel 121.

Here, when the vibration is propagated to the projector 1 from an outside, or when the vibration is generated due to an internal factor such as a fan of the projector 1, the projection optical device 12 provided to protrude to an outside of the exterior housing 11 is more likely to greatly vibrate than the exterior housing 11. In this manner, when the projection optical device 12 vibrates, the image projected onto the projection surface by the projection optical device 12 shakes greatly.

From such a problem, in the embodiment, by providing the vibration reduction device 2 at the projection optical device 12, the vibration of the projection optical device 12 is reduced, and therefore the shaking of the image is restricted.

Hereinafter, a configuration of the vibration reduction device 2 will be described in detail.

The vibration reduction device 2 includes a device main body 21, the cable 28, and a fixture 29.

The cable 28 extends from the device main body 21. The cable 28 is coupled to the coupling terminal 112, and supplies the electric power supplied from the coupling terminal 112 to the device main body 21.

The fixture 29 fixes the device main body 21 to the vibration reduction target. In the embodiment, the fixture 29 is implemented by a belt, and is wound around an outer peripheral surface of the lens barrel 121 provided in the projection optical device 12 which is the vibration reduction target. However, the fixture 29 is not limited thereto, and may be a fastening member such as a screw as long as the fixture 29 can fix a housing 22 to the vibration reduction target.

Figure 2:
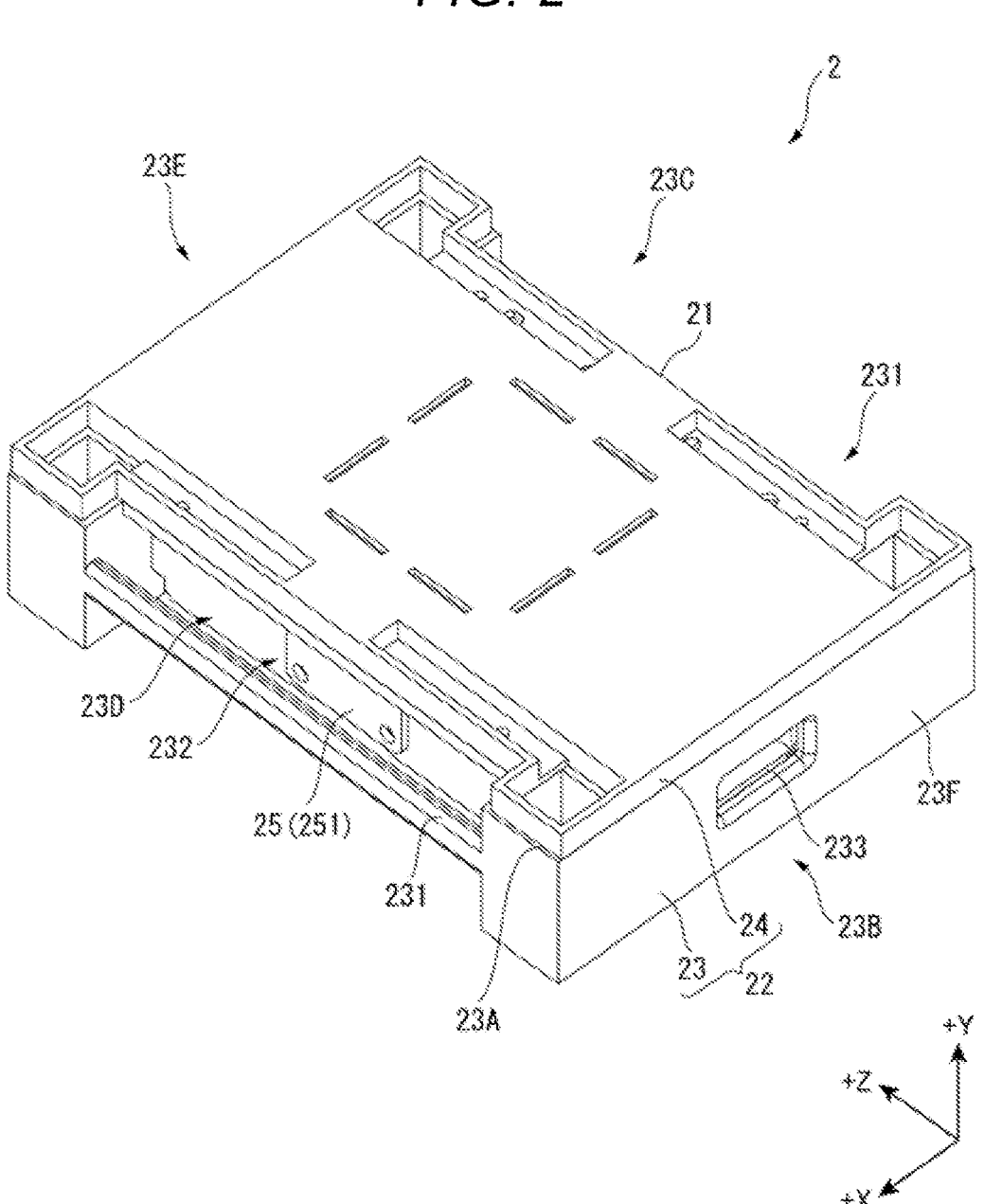
FIG. 2 is a perspective view showing a device main body of a vibration reduction device according to the first embodiment.
Figure 3:
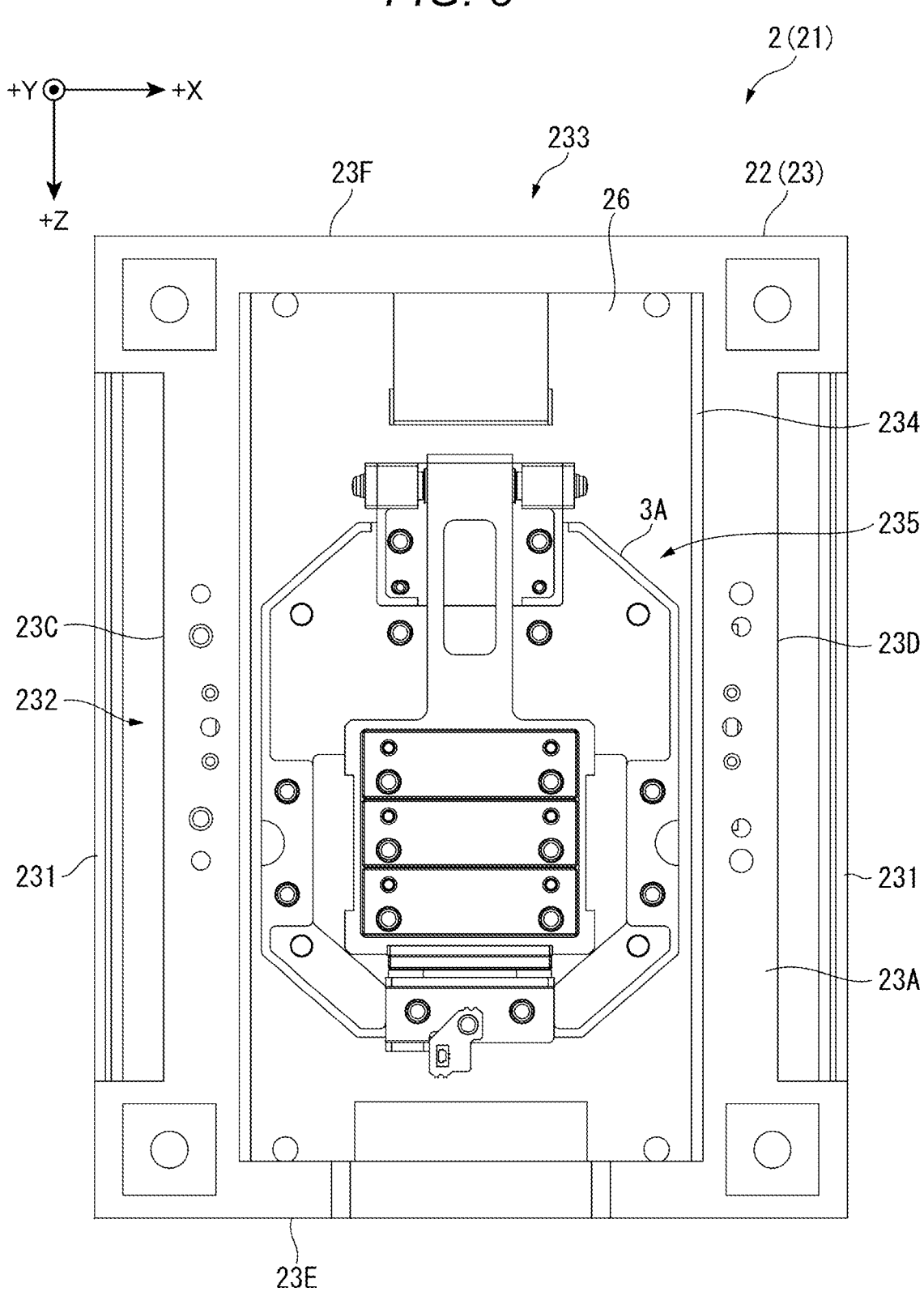
FIG. 3 is a plan view showing the device main body from which a lid member is removed according to the first embodiment.

FIG. 2 is a perspective view showing the device main body 21, and FIG. 3 is a plan view showing the device main body 21 in a state where a lid member 24 is removed.

The device main body 21 generates vibration opposite in phase from the vibration of the lens barrel 121 to reduce the vibration of the lens barrel 121. The device main body 21 includes the housing 22 and a detection unit 25 as shown in FIG. 2, and further includes an operation control unit 26 and a vibration generation device 3A as shown in FIG. 3.

The housing 22 houses the detection unit 25, the operation control unit 26, and the vibration generation device 3A. As shown in FIG. 2, the housing 22 includes a frame 23 and the lid member 24, and is formed in a substantially rectangular parallelepiped shape by combining the frame 23 and the lid member 24.

The lid member 24 is formed in a rectangular plate shape, and is detachably attached to a first surface 23A of the frame 23.

As shown in FIGS. 2 and 3, the frame 23 is formed in a rectangular frame shape having the first surface 23A, a second surface 23B, a third surface 23C, a fourth surface 23D, a fifth surface 23E, and a sixth surface 23F. The first surface 23A and the second surface 23B are opposite-side surfaces. The third surface 23C and the fourth surface 23D are opposite-side surfaces, and the fifth surface 23E and the sixth surface 23F are opposite-side surfaces.

As shown in FIG. 2, the frame 23 includes fixture attachment portions 231, a sensor attachment portion 232, and a terminal portion 233.

As shown in FIG. 2, the fixture attachment portions 231 are rod-shaped portions provided in a portion of the frame 23 on the third surface 23C side and a portion of the frame 23 on the fourth surface 23D side. End portions of the fixture 29 are attached to the fixture attachment portions 231.

The sensor attachment portion 232 is disposed between the third surface 23C and the fourth surface 23D. The detection unit 25 is attached to the sensor attachment portion 232.

The terminal portion 233 is provided substantially at a center of the sixth surface 23F. The cable 28 is coupled to the terminal portion 233, and the electric power is supplied from the coupling terminal 112 via the cable 28.

The detection unit 25 detects the vibration acting on the vibration reduction device 2. The detection unit 25 includes a printed circuit board 251 and a sensor (not shown) provided at the printed circuit board 251. The printed circuit board 251 is attached to the sensor attachment portion 232, and outputs a direction and an amplitude of the vibration detected by the sensor to the operation control unit 26. Examples of the sensor provided in the detection unit 25 include an acceleration sensor and a gyro sensor.

As shown in FIG. 3, the frame 23 further includes a disposition portion 234 and an attachment portion 235.

The disposition portion 234 and the attachment portion 235 are covered with the lid member 24 attached to the first surface 23A. In other words, the disposition portion 234 and the attachment portion 235 are exposed when the lid member 24 is removed from the frame 23.

The operation control unit 26 is disposed in the disposition portion 234.

The vibration generation device 3A is attached to the attachment portion 235.

The operation control unit 26 is a printed circuit board at which a plurality of circuit elements are mounted, and is disposed in the disposition portion 234. The operation control unit 26 controls operations of the vibration reduction device 2. Specifically, the operation control unit 26 operates the vibration generation device 3A based on a detection result obtained by the detection unit 25. Specifically, the operation control unit 26 supplies driving power to the vibration generation device 3A, and operates the vibration generation device 3A to generate the vibration opposite in phase from the vibration detected by the detection unit 25.

Configuration of Vibration Generation Device

Figure 4:
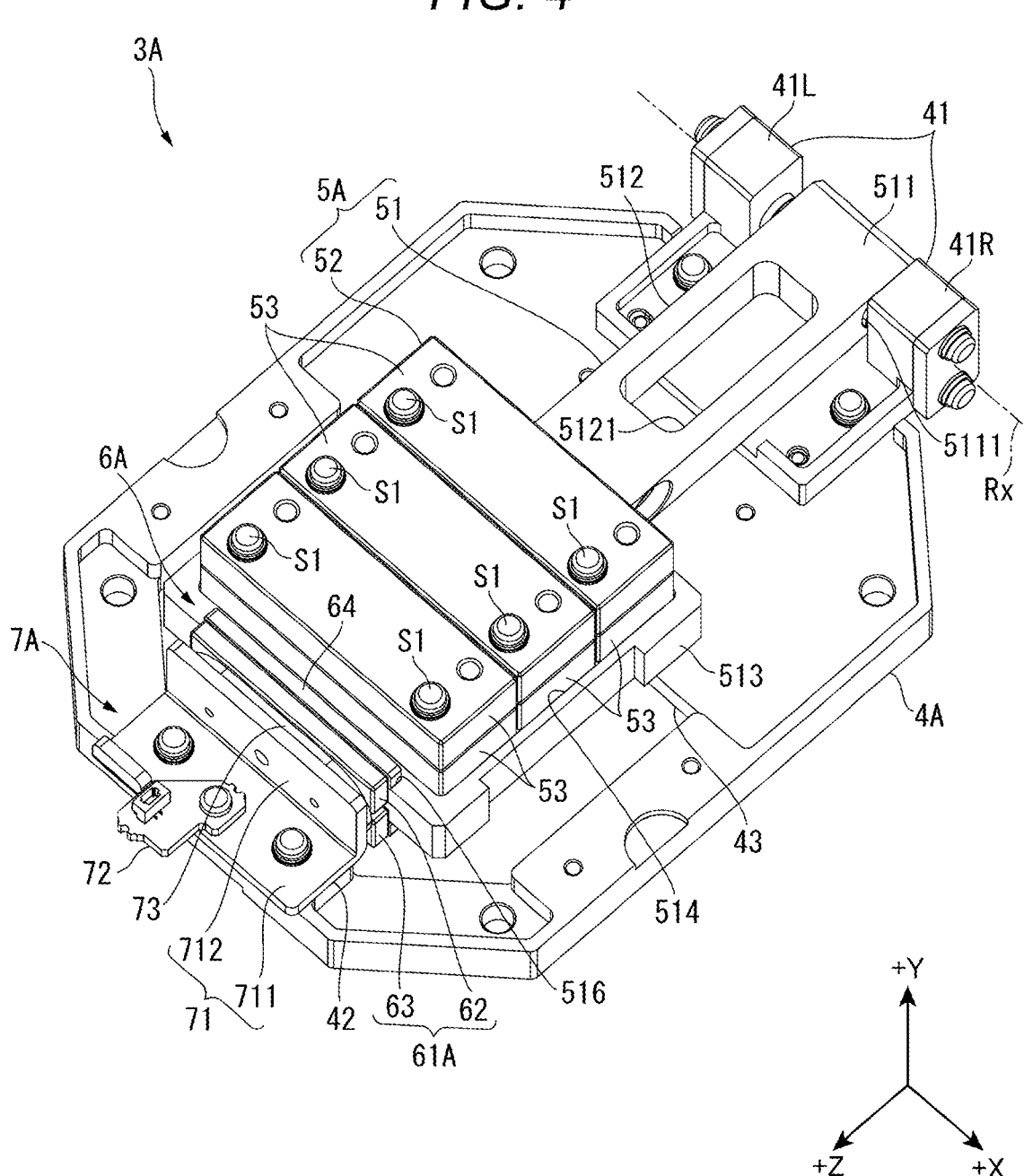
FIG. 4 is a perspective view showing a vibration generation device according to the first embodiment.
Figure 5:
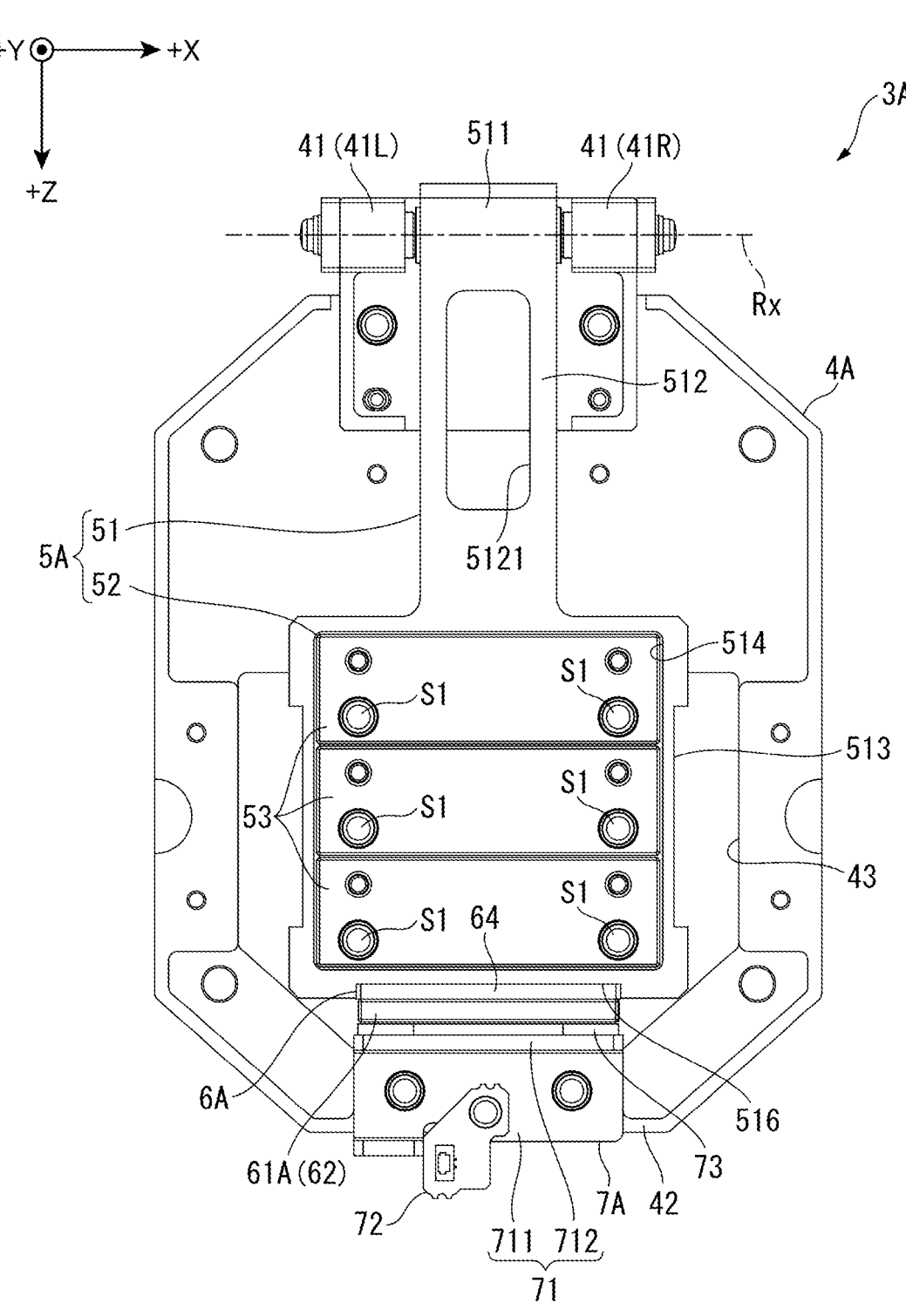
FIG. 5 is a plan view showing the vibration generation device according to the first embodiment.

FIG. 4 is a perspective view showing the vibration generation device 3A, and FIG. 5 is a plan view showing the vibration generation device 3A.

The vibration generation device 3A is attached to the attachment portion 235 provided in the frame 23. The vibration generation device 3A generates the vibration for reducing the vibration of the lens barrel 121, which is a vibration reduction object, under the control of the operation control unit 26. As shown in FIGS. 4 and 5, the vibration generation device 3A includes a base 4A, a pendulum 5A, a first induction unit 6A, and a first driving unit 7A.

In the following description, three directions orthogonal to one another are defined as a +X direction, a +Y direction, and a +Z direction. The +X direction is a direction along a rotation axis Rx of the pendulum 5A, and is a direction from the third surface 23C toward the fourth surface 23D described above. The +Y direction is a direction perpendicular to the base 4A, and is a direction from the second surface 23B toward the first surface 23A described above. The +Z direction is a direction from the rotation axis Rx toward the first driving unit 7A when viewed from the +Y direction, and is a direction from the sixth surface 23F toward the fifth surface 23E described above. Further, although not shown, a direction opposite from the +X direction is defined as a −X direction, a direction opposite from the +Y direction is defined as a −Y direction, and a direction opposite from the +Z direction is defined as a −Z direction.

Configuration of Base

Figure 6:
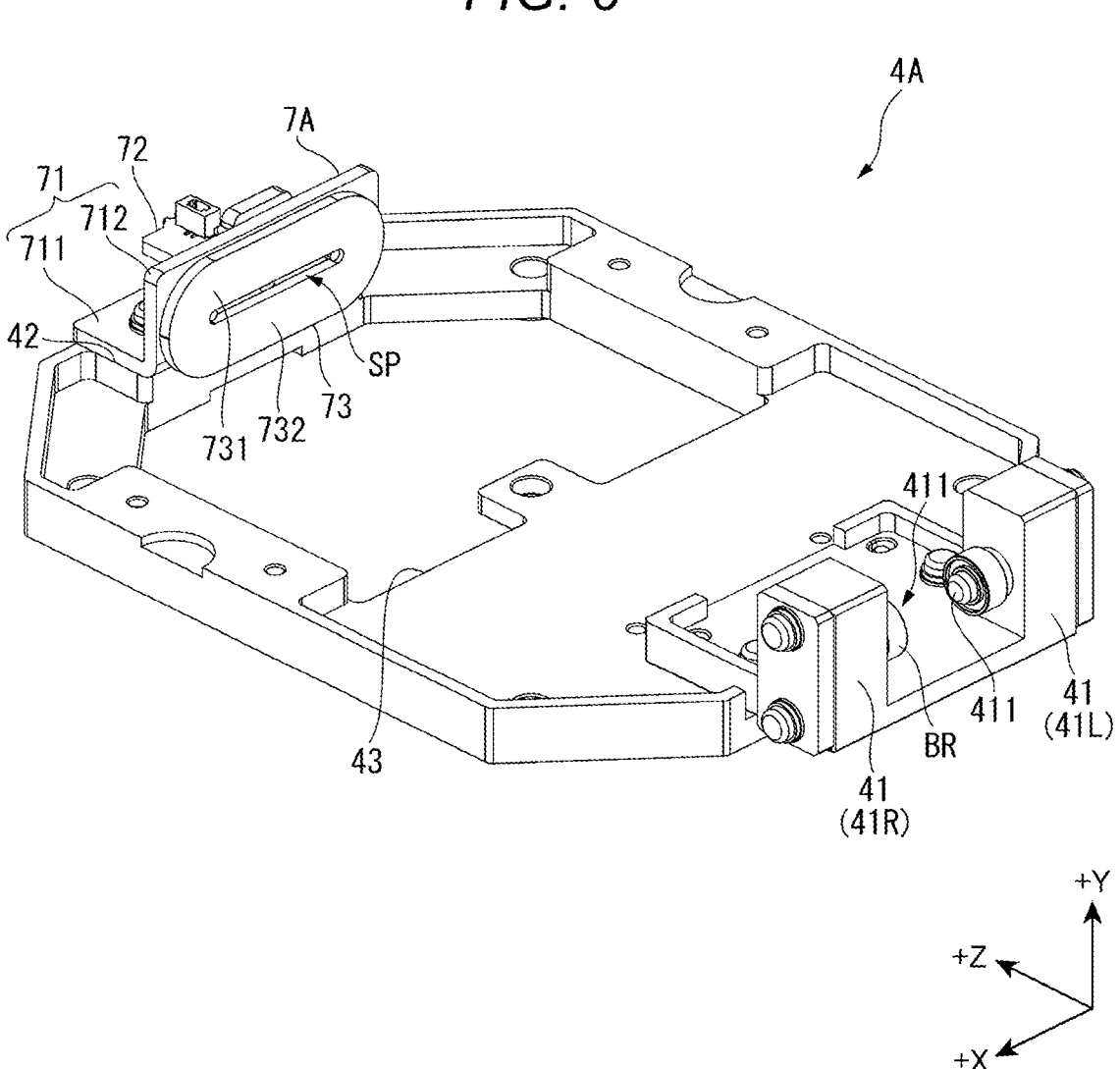
FIG. 6 is a perspective view showing the vibration generation device from which a pendulum is removed according to the first embodiment.

FIG. 6 is a perspective view showing the vibration generation device 3A in a state where the pendulum 5A is removed.

The base 4A is a plate-shaped member formed in a flat plate shape. The base 4A transmits the vibration generated by the vibration generation device 3A to an object in which the base 4A is provided, that is, the frame 23. The base 4A supports the pendulum 5A, the first induction unit 6A, and the first driving unit 7A, and is attached to the attachment portion 235 shown in FIG. 3. The base 4A includes a pair of support portions 41, a fixing portion 42, and a relief portion 43.

The pair of support portions 41 rotatably support an end portion of the pendulum 5A in the −Z direction. The pair of support portions 41 are provided at positions sandwiching, in the +X direction, the end portion of the pendulum 5A in the −Z direction at an end portion of the base 4A in the −Z direction. As shown in FIG. 6, each of the pair of support portions 41 includes a pin 411 that forms the rotation axis Rx of the pendulum 5A. Of the pair of support portions 41, the pin 411 included in a support portion 41L disposed in the −X direction protrudes from the support portion 41L in the +X direction, and the pin 411 included in a support portion 41R disposed in the +X direction protrudes from the support portion 41R in the −X direction. The pins 411 are inserted into the pendulum 5A. Accordingly, the pendulum 5A is supported to be rotatable around the rotation axis Rx along the +X direction.

As shown in FIGS. 4 to 6, the fixing portion 42 is a portion of the base 4A to which the first driving unit 7A is fixed. The fixing portion 42 is provided at an end portion of the base 4A in the +Z direction.

The relief portion 43 is provided between the pair of support portions 41 and the fixing portion 42 in the +Z direction. The relief portion 43 is a portion for preventing a portion of the pendulum 5A in the +Z direction and the first induction unit 6A from coming into contact with the base 4A when the pendulum 5A swings around the rotation axis Rx. In the embodiment, the relief portion 43 is an opening penetrating the base 4A along the +Y direction. However, the relief portion 43 is not limited thereto, and may be a recess that opens in a direction opposite from a direction facing the pendulum 5A. Specifically, the relief portion 43 may be a recess that opens in the +Y direction or the −Y direction. When the relief portion 43 is the recess, the relief portion 43 can also be configured such that the portion of the pendulum 5A in the +Z direction and an end portion of the first induction unit 6A do not come into contact with the base 4A.

Configuration of Pendulum

Figure 7:
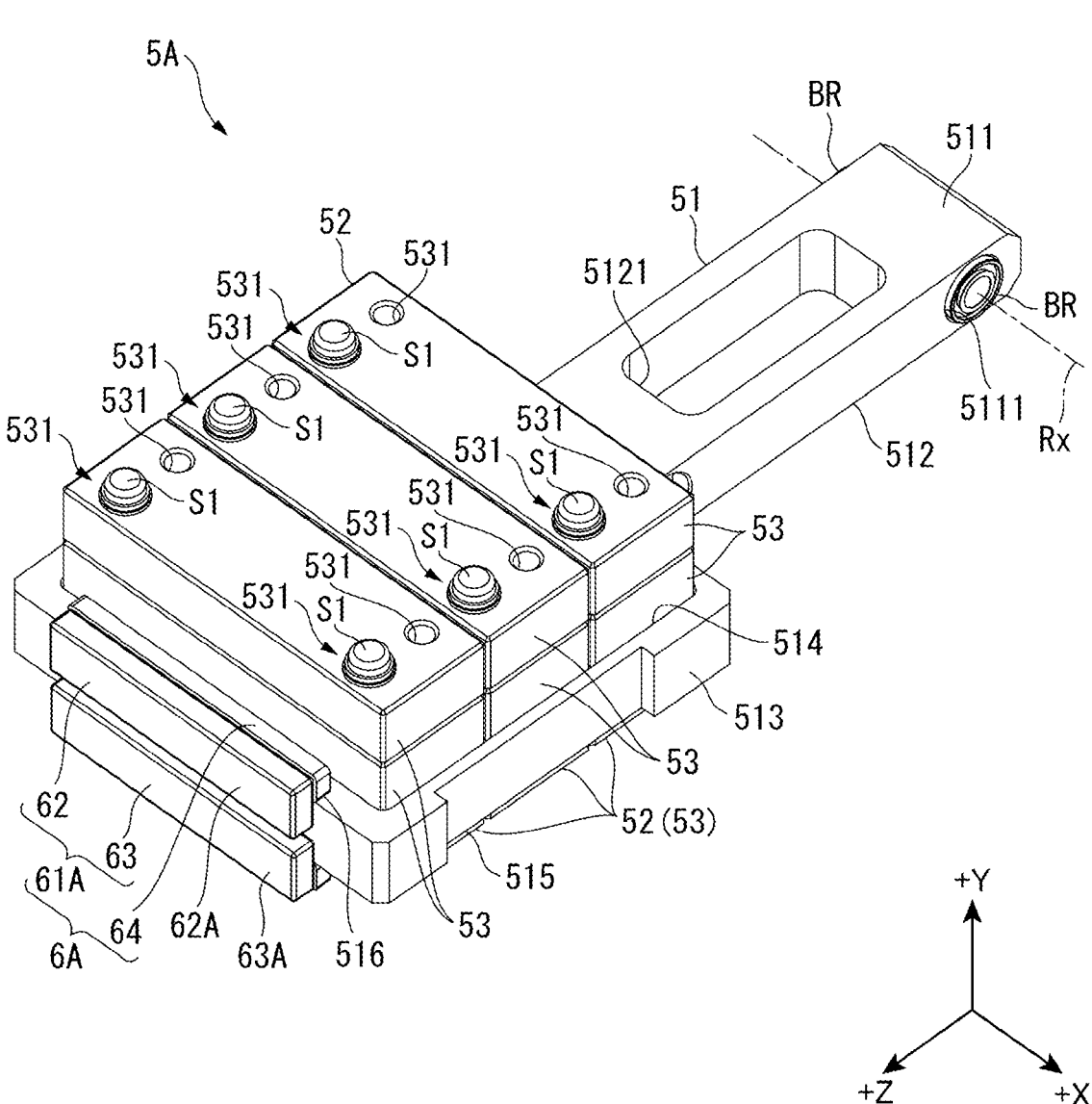
FIG. 7 is a perspective view showing the pendulum according to the first embodiment.
Figure 8:
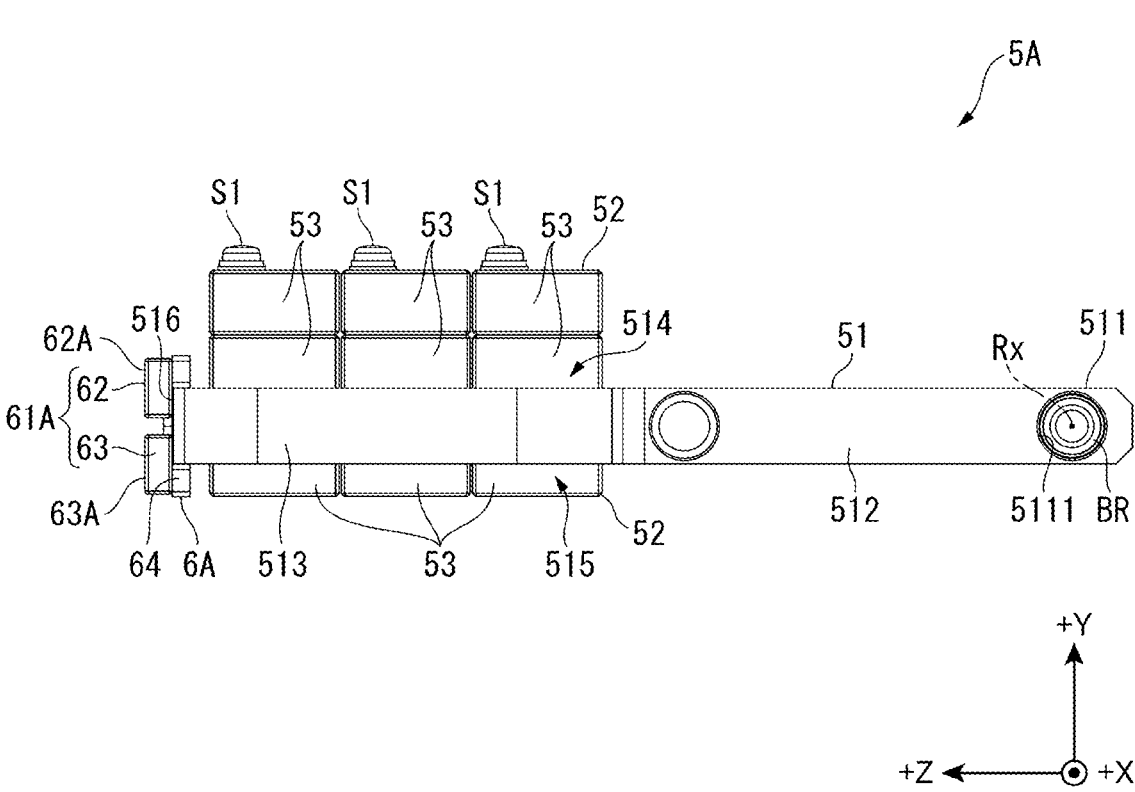
FIG. 8 is a side view showing the pendulum according to the first embodiment.

FIG. 7 is a perspective view showing the pendulum 5A. FIG. 8 is a side view of the pendulum 5A as viewed from the +X direction.

The pendulum 5A is supported by the base 4A swingably around the rotation axis Rx. The pendulum 5A generates the vibration by being swung around the rotation axis Rx by the first driving unit 7A. As shown in FIGS. 7 and 8, the pendulum 5A includes an arm 51 and a weight portion 52.

As shown in FIG. 7, when viewed from the +Y direction, the arm 51 has a substantially T-shape in which an end portion of the arm 51 in the +Z direction is larger than an end portion thereof in the −Z direction. As shown in FIGS. 7 and 8, the arm 51 includes a coupling portion 511, an extending portion 512, an enlarged portion 513, disposition portions 514 and 515, and an attachment portion 516.

The coupling portion 511 is a portion of the arm 51 supported by the pair of support portions 41. In the embodiment, the coupling portion 511 is provided at an end portion of the arm 51 in the −Z direction. A hole portion 5111 is provided in each of a surface of the coupling portion 511 facing the +X direction and a surface thereof facing the −X direction. A bearing BR shown in FIG. 6 is disposed inside each hole portion 5111. The pin 411 of each support portion 41 is inserted into the bearing BR via a washer (not shown), and thus the arm 51, hence, the pendulum 5A is supported by the pair of support portions 41.

The extending portion 512 is an extending portion from the coupling portion 511 to the enlarged portion 513. A dimension of the extending portion 512 along the +X direction is smaller than a dimension of the enlarged portion 513 along the +X direction, and the dimension of the extending portion 512 along the +X direction is the same in a range from the coupling portion 511 to the enlarged portion 513. The extending portion 512 is provided with a through hole 5121 to reduce a weight of the pendulum 5A and to locate a position of a center of gravity of the pendulum 5A further toward the +Z direction. However, the through hole 5121 is not limited thereto. A recess may be provided instead of the through hole 5121, and the through hole 5121 may not be provided.

The enlarged portion 513 is a portion of the arm 51 in the +Z direction. The dimension of the enlarged portion 513 along the +X direction is larger than a dimension of the coupling portion 511 along the +X direction. The center of gravity of the pendulum 5A including the enlarged portion 513 is located closer to the +Z direction than is an intermediate position between the rotation axis Rx and an end portion of the pendulum 5A in the +Z direction. That is, regardless of a configuration and disposition of the weight portion 52, the center of gravity of the pendulum 5A is located closer to a first driving unit 7A side than is the intermediate position between the rotation axis Rx and the end portion of the pendulum 5A on the first driving unit 7A side.

The disposition portion 514 is provided at a surface of the enlarged portion 513 in the +Y direction, and the disposition portion 515 is provided at a surface of the enlarged portion 513 in the −Y direction. The disposition portion 514 is a recess recessed in the −Y direction from the surface of the enlarged portion 513 in the +Y direction, and is formed in a substantially square shape when viewed from the +Y direction. The disposition portion 515 is a recess recessed in the +Y direction from the surface of the enlarged portion 513 in the −Y direction, and is formed in a substantially square shape when viewed from the −Y direction. The weight portion 52 is disposed in at least one of the disposition portions 514 and 515. That is, the disposition portions 514 and 515 are provided at positions separated from the rotation axis Rx toward the attachment portion 516 side, and are portions where the weight portions 52 can be disposed.

The weight portion 52 includes at least one weight portion member 53.

The weight portion member 53 is formed in a substantially rectangular parallelepiped shape having a longitudinal axis along the +X direction, and is disposed along the +X direction in one of the disposition portions 514 and 515. The weight portion member 53 has through holes 531 penetrating the weight portion member 53 along the +Y direction. The weight portion member 53 is fixed to one of the disposition portions 514 and 515 by screws S1 inserted through the through holes 531.

In the disposition portion 514, three weight portion members 53 can be disposed along the +Z direction, and the weight portion members 53 can be further disposed in the +Y direction with respect to the weight portion members 53 disposed in the disposition portion 514. When a plurality of weight portion members 53 are disposed to overlap each other in the +Y direction, the plurality of weight portion members 53 are fixed to the disposition portion 514 in a state where the screws S1 are inserted through the through holes 531 of each weight portion member 53. The same applies to the disposition portion 515. With such a configuration, the number and the disposition of the weight portion members 53 provided in the pendulum 5A can be adjusted.

The attachment portion 516 is provided at the end portion of the arm 51 in the +Z direction. That is, the attachment portion 516 is an end portion on an opposite side of a center of the pendulum 5A from the rotation axis Rx, in the +Z direction which is an extending direction of the pendulum 5A extending from the rotation axis Rx among directions intersecting with the rotation axis Rx. That is, the attachment portion 516 is a tip end portion facing the +Z direction in the arm 51 extending from the rotation axis Rx, and is a free end of the arm 51. The attachment portion 516 is a recess recessed in the −Z direction at the end portion of the arm 51 in the +Z direction, and a plate member 64 provided in the first induction unit 6A is attached to the attachment portion 516.

Configuration of First Induction Unit

The first induction unit 6A is fixed to an end portion of the pendulum 5A on a side opposite from the rotation axis Rx. That is, the first induction unit 6A is attached to the attachment portion 516. The first induction unit 6A acts on a magnetic field generated by the first driving unit 7A to induce the swing of the pendulum 5A. The first induction unit 6A includes a magnet 61A and the plate member 64.

The magnet 61A is attracted or repelled with respect to a magnetic force generated by a coil 73 of the first driving unit 7A to be described later. The magnet 61A includes a first magnet member 62 and a second magnet member 63.

Each of the first magnet member 62 and the second magnet member 63 is formed in a substantially rectangular parallelepiped shape having a longitudinal axis along the +X direction. A dimension of the first magnet member 62 along the +X direction and a dimension of the second magnet member 63 along the +X direction substantially coincide with a dimension of the to-be-described coil 73 along the +X direction of the first driving unit 7A.

The first magnet member 62 is disposed in the +Y direction. A surface 62A of the first magnet member 62 facing the +Z direction is a surface substantially parallel to an XY plane and faces a first extending portion 731 of the coil 73 to be described later. A magnetic pole of the surface 62A is an S pole in the embodiment.

The second magnet member 63 is disposed to be separated from the first magnet member 62 in the −Y direction.

Specifically, the second magnet member 63 is separated from the first magnet member 62 in the −Y direction from the first extending portion 731 toward a to-be-described second extending portion 732 in the coil 73. A surface 63A of the second magnet member 63 facing the +Z direction is a surface substantially parallel to the XY plane and faces the second extending portion 732. A magnetic pole of the surface 63A is an N pole in the embodiment. That is, the magnetic pole of the surface 62A of the first magnet member 62 facing the first extending portion 731 is different from the magnetic pole of the surface 63A of the second magnet member 63 facing the second extending portion 732.

The plate member 64 is fixed to the attachment portion 516 by an adhesive or the like in a state of supporting the magnet 61A. Specifically, the plate member 64 supports the first magnet member 62 at a portion in the +Y direction at a surface of the plate member 64 facing the +Z direction, and supports the second magnet member 63 at a portion in the −Y direction at the surface thereof facing the +Z direction.

The plate member 64 is formed of a metal in a flat plate shape, and functions as a yoke that amplifies an attraction force of the magnet 61A. That is, the vibration generation device 3A includes the plate member 64 which is a magnet-side yoke disposed at a position on the rotation axis Rx side of the magnet of the first induction unit 6A.

Configuration of First Driving unit

As shown in FIGS. 4 to 6, the first driving unit 7A is fixed to the base 4A, and applies a driving force to the first induction unit 6A provided at the pendulum 5A to swing the pendulum 5A. Specifically, the first driving unit 7A applies the driving force to the pendulum 5A to swing the pendulum 5A based on a control signal input from the operation control unit 26. The first driving unit 7A includes a holding member 71, a terminal portion 72, and the coil 73, and further includes a control unit (not shown).

The holding member 71 is fixed to the fixing portion 42 in a state of holding the terminal portion 72 and the coil 73. The holding member 71 includes a first plate-shaped portion 711 along an XZ plane and a second plate-shaped portion 712 along the XY plane, and is formed in a substantially L shape when viewed from the −X direction.

A surface of the first plate-shaped portion 711 in the −Y direction is in contact with the fixing portion 42. The terminal portion 72 is attached to a surface of the first plate-shaped portion 711 in the +Y direction.

The second plate-shaped portion 712 stands in the +Y direction from an end portion of the first plate-shaped portion 711 in the −Z direction. The coil 73 is attached to a surface of the second plate-shaped portion 712 in the −Z direction. That is, the coil 73 is attached to a surface of the second plate-shaped portion 712 facing the magnet 61A. Since the holding member 71 is made of a ferromagnetic material, the second plate-shaped portion 712 functions as a yoke that controls a direction of a magnetic field generated by the coil 73. That is, the vibration generation device 3A includes the holding member 71 which holds the coil 73 and includes the second plate-shaped portion 712 which is a coil-side yoke disposed on an opposite side of the coil 73 from the magnet 61A. In other words, the holding member 71 includes the second plate-shaped portion 712 which is a first yoke disposed on an opposite side of the coil 73 from the rotation axis Rx.

The terminal portion 72 is electrically coupled to the operation control unit 26 of the vibration reduction device 2, and supplies a current supplied from the operation control unit 26 to the control unit (not shown). The control unit causes the coil 73 to generate the magnetic field by ener-gizing the coil 73, thereby applying the driving force to the pendulum 5A including the magnet 61A to swing the pen-dulum 5A. Specifically, the control unit causes an AC current to flow through the coil 73 to alternately reverse the direction of the magnetic field generated by the coil 73, thereby swinging the pendulum 5A around the rotation axis Rx. That is, the control unit alternately switches a direction of the current flowing through the coil 73 of the first driving unit 7A.

The coil 73 is provided in a configuration other than the pendulum 5A. In the embodiment, the coil 73 is fixed to the base 4A by the holding member 71. The coil 73 is disposed to face the magnet 61A in a non-contact manner, and generates the magnetic field acting on the magnet 61A.

As shown in FIG. 6, the coil 73 is an air-core coil formed by winding a conductive wire in a planar manner in a track shape or an oval shape having a longitudinal axis in the +X direction when viewed from the −Z direction which is the magnet 61A side. Therefore, when viewed from the magnet 61A side, a dimension of the coil 73 along the longitudinal axis is larger than a dimension of the coil 73 along a transverse axis orthogonal to the longitudinal axis.

The coil 73 includes the first extending portion 731 and the second extending portion 732.

The first extending portion 731 is a portion extending linearly along the longitudinal axis of the coil 73. The first extending portion 731 is disposed in the +Y direction with respect to an air-core portion SP of the coil 73.

The second extending portion 732 is disposed on a side opposite from the first extending portion 731 with the air-core portion SP of the coil 73 sandwiched therebetween. That is, the second extending portion 732 is disposed in the −Y direction with respect to the first extending portion 731. The second extending portion 732 linearly extends along the longitudinal axis of the coil 73. A dimension of the second extending portion 732 along the longitudinal axis of the coil 73 is substantially the same as a dimension of the first extending portion 731 along the longitudinal axis of the coil 73. When the control unit causes the current to flow through the coil 73, a direction of the current in the second extending portion 732 is opposite from a direction of the current in the first extending portion 731.

Therefore, when the current flows through the coil, a magnetic field in which a magnetic force is directed from one of the first extending portion 731 and the second extending portion 732 to the other extending portion is generated. That is, one of the extending portions is an N pole, and the other extending portion is an S pole. The control unit causes an AC current of a predetermined fre-quency to flow through the coil 73, thereby alternately switching the magnetic pole of the first extending portion 731 and the magnetic pole of the second extending portion 732.

In the embodiment, the coil 73 is the air-core coil having no core as described above, and may be a coil having a core between the first extending portion 731 and the second extending portion 732.

Vibration of Pendulum

Figure 9:
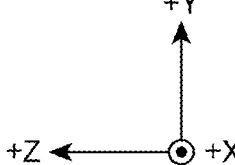
FIG. 9 is an enlarged cross-sectional view showing a part of the vibration generation device according to the first embodiment.

FIG. 9 is an enlarged cross-sectional view of an end portion of the vibration generation device 3A in the +Z direction.

In the vibration generation device 3A, the pendulum 5A supported by the base 4A swingably around the rotation axis Rx includes the magnet 61A. Of the first magnet member 62 and the second magnet member 63 constituting the magnet 61A, the first magnet member 62 faces the first extending portion 731 in a non-contact manner, and the second magnet member 63 faces the second extending portion 732 in a non-contact manner. The magnetic pole of the surface 62A of the first magnet member 62 facing the first extending portion 731 is different from the magnetic pole of the surface 63A of the second magnet member 63 facing the second extending portion 732.

On the other hand, the control unit causes the AC current to flow through the coil 73. Therefore, the magnetic pole of the first extending portion 731 and the magnetic pole of the second extending portion 732 are alternately switched.

Therefore, the pendulum 5A alternately swings in a first direction D1 around the rotation axis Rx and a second direction D2 opposite from the first direction according to a frequency of the AC current.

The frequency of the AC current flowing through the coil 73 is set according to the vibration of the projection optical device 12 detected by the detection unit 25 provided in the vibration reduction device 2.

Accordingly, the vibration generation device 3A can generate the vibration opposite in phase from the vibration propagated to the projection optical device 12, and therefore the vibration of the projection optical device 12 can be reduced.

Effects of First Embodiment

The projector 1 according to the embodiment described above has the following effects.

The projector 1 corresponds to the electronic apparatus. The projector 1 includes the vibration reduction device 2. The vibration reduction device 2 includes the vibration generation device 3A, the detection unit 25 which detects the vibration, and the operation control unit 26 which causes the vibration generation device 3A to generate the vibration opposite in phase from the vibration detected by the detection unit 25.

The vibration generation device 3A includes the base 4A, the pendulum 5A, the first induction unit 6A, and the first driving unit 7A. The base 4A transmits the vibration to the object. The pendulum 5A is supported by the base 4A swingably around the rotation axis Rx. The first induction unit 6A includes the magnet 61A, is provided at the opposite-side end portion of the pendulum 5A from the rotation axis Rx, and incudes the swing of the pendulum 5A. The first driving unit 7A includes the coil 73 and applies the driving force to the pendulum 5A. The coil 73 faces the magnet 61A in a non-contact manner.

According to such a configuration, the magnet 61A facing the coil 73 in a non-contact manner and acting on the magnetic field generated by the coil 73 is provided in the pendulum 5A. Accordingly, there is no need to provide, in the pendulum 5A supported by the base 4A swingably around the rotation axis Rx, a wiring for supplying the current. Therefore, when the pendulum 5A swings, a damage to the wiring for supplying the current to the coil 73 can be prevented, and the pendulum 5A can be reliably swung. Therefore, reliability of the vibration generation device 3A can be improved. Further, since the vibration generation device 3A can generate the vibration opposite in phase from the vibration detected by the detection unit 25, the vibration of the projector 1 can be reduced.

The vibration generation device 3A includes the control unit that alternately switches the direction of the current flowing through the coil 73 of the first driving unit 7A. In other words, the AC current flows through the coil 73 of the first driving unit 7A.

According to such a configuration, the direction of the magnetic field generated by the coil 73 can be alternately reversed. Accordingly, the pendulum 5A including the magnet 61A can be swung.

Therefore, the vibration can be generated by the vibration generation device 3A.

In the vibration generation device 3A, the second plate-shaped portion 712 of the holding member 71 is provided at a position on an opposite side of the coil 73 of the first driving unit 7A from the rotation axis Rx. The second plate-shaped portion 712 functions as a yoke for the coil 73.

The plate member 64 is provided at a position on the rotation axis Rx side of the magnet 61A of the first induction unit 6A. The plate member 64 functions as a yoke for the magnet 61A.

According to such a configuration, the magnetic force generated in the coil 73 can be directed to the magnet 61A by the second plate-shaped portion 712. In addition, the plate member 64 can increase the attraction force of the magnet 61A. Therefore, since an interaction between the magnetic field generated by the coil 73 and the magnet 61A, that is provided in the pendulum 5A, can be strengthened, the current flowing through the coil 73 for swinging the pendulum 5A can be reduced.

In the vibration generation device 3A, the second plate-shaped portion 712 functioning as the yoke corresponds to the first yoke provided at the position on the opposite side of the coil 73 of the first driving unit 7A from the rotation axis Rx. The holding member 71 including the second plate-shaped portion 712 is provided at the base 4A and holds the coil 73.

According to such a configuration, there is no need to separately provide a member for fixing the coil 73 to the base 4A. Therefore, an increase in the number of components of the vibration generation device 3A can be prevented.

In the vibration generation device 3A, the center of gravity of the pendulum 5A is located closer to the first driving unit 7A side than is the intermediate position between the rotation axis Rx and the end portion of the pendulum 5A on the first driving unit 7A side. That is, the center of gravity of the pendulum 5A is located closer to an opposite side from the rotation axis Rx than is the intermediate position between the rotation axis Rx and the end portion of the pendulum 5A on the opposite side from the rotation axis Rx in the extending direction of the pendulum 5A from the rotation axis Rx.

According to such a configuration, a rotational torque generated when the pendulum 5A swings can be improved. Therefore, the vibration generated by the vibration generation device 3A can be increased.

In the vibration generation device 3A, the pendulum 5A includes the disposition portions 514 and 515, in which the weight portions 52 are disposed, at positions separated from the rotation axis Rx toward the first driving unit 7A side.

According to such a configuration, by adjusting the number of the weight portion members 53 constituting the weight portion 52 to adjust a weight of the weight portion 52 provided at the disposition portions 514 and 515, a rotational torque generated when the pendulum 5A swings can be increased. Therefore, the vibration generated by the vibration generation device 3A can be adjusted.

In the vibration generation device 3A, the coil 73 of the first driving unit 7A is the air-core coil having the longitudinal axis along the +X direction. The magnet 61A of the first induction unit 6A is disposed to face the coil 73 along the longitudinal axis of the coil 73.

According to such a configuration, since the coil 73 used in the vibration generation device 3A is the air-core coil, a cost of the coil can be reduced as compared with a coil having a core, and therefore a manufacturing cost of the vibration generation device 3A can be reduced.

In addition, since the magnet 61A is disposed along the longitudinal axis of the coil 73, the interaction between the magnetic field generated by the coil 73 and the magnet 61A can be increased.

In the vibration generation device 3A, the coil 73 includes the first extending portion 731 extending along the longitudinal axis of the coil 73 and the second extending portion 732 extending along the longitudinal axis of the coil 73 and through which a current flows in a direction opposite from that of the first extending portion 731. The magnetic pole of the surface of the magnet 61A of the first induction unit 6A facing the first extending portion 731 is different from the magnetic pole of the surface of the magnet 61A facing the second extending portion 732.

According to such a configuration, the direction of the magnetic field generated by the coil 73 is alternately changed, and therefore the pendulum 5A to which the magnet 61A is fixed can be reliably swung.

In the vibration generation device 3A, the magnet 61A includes the first magnet member 62 and the second magnet member 63. The first magnet member 62 is disposed to face the first extending portion 731. The second magnet member 63 faces the second extending portion 732 and is disposed to be separated from the first magnet member 62 in the −Y direction from the first extending portion 731 toward the second extending portion 732. The magnetic pole of the surface of the first magnet member 62 facing the first extending portion 731 is different from the magnetic pole of the surface of the second magnet member 63 facing the second extending portion 732.

According to such a configuration, since the second magnet member 63 is provided to be separated from the first magnet member 62 in the −Y direction from the first extending portion 731 toward the second extending portion 732, an attraction force and a repulsive force of the magnet 61A with respect to the magnetic field generated by the coil 73 can be increased. Therefore, a torque when the pendulum 5A swings can be increased.

In the vibration generation device 3A, the base 4A includes the relief portion 43 that avoids contact with the pendulum 5A.

According to such a configuration, noise due to the contact of the pendulum 5A with the base 4A can be prevented from occurring when the pendulum 5A swings. Therefore, a sound of the vibration generation device 3A can be reduced.

First Modification of First Embodiment

In the vibration generation device 3A described above, the magnet 61A includes the first magnet member 62 and the second magnet member 63 that are separated from each other in the −Y direction from the first extending portion 731 toward the second extending portion 732. However, the disclosure is not limited thereto, and a magnet provided at the pendulum 5A may be one magnet facing the first extending portion 731 and the second extending portion 732.

Figure 10:
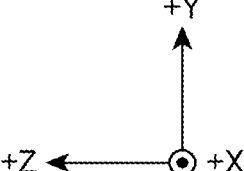
FIG. 10 is a view showing a vibration generation device according to a first modification of the first embodiment.

FIG. 10 is a cross-sectional view showing a first modification of the vibration generation device 3A. Specifically, FIG. 10 is a cross-sectional view showing a magnet 61B that is a deformation of the magnet 61A of the vibration generation device 3A.

For example, the vibration generation device 3A may use the magnet 61B shown in FIG. 10 as a magnet of the first induction unit 6A instead of the magnet 61A.

Unlike the magnet 61A including the first magnet member 62 and the second magnet member 63, the magnet 61B is formed by a single magnet member.

The magnet 61B is formed in a rectangular parallelepiped shape having a longitudinal axis along the +X direction substantially parallel to a longitudinal axis of the coil 73, and is disposed to face the coil 73 in a non-contact manner. A dimension of the magnet 61B along the longitudinal axis is substantially the same as a dimension of the coil 73 along the longitudinal axis, and a dimension of the magnet 61B along the +Y direction orthogonal to the longitudinal axis is substantially the same as a dimension of the coil 73 along the +Y direction.

The magnet 61B includes a portion 61B1 facing the first extending portion 731 of the coil 73 and a portion 61B2 facing the second extending portion 732 of the coil 73, and the portion 61B1 and the portion 61B2 are coupled to each other. A magnetic pole of a surface of the portion 61B1 facing the first extending portion 731 is different from a magnetic pole of a surface of the portion 61B2 facing the second extending portion 732. For example, the magnetic pole of the surface of the portion 61B1 facing the first extending portion 731 is an S pole, and the magnetic pole of the surface of the portion 61B2 facing the second extending portion 732 is an N pole.

The vibration generation device 3A using such a magnet 61B can also achieve the same effects as those described above.

Second Modification of First Embodiment

In the vibration generation device 3A described above, the pendulum 5A is supported by the pair of support portions 41, which are provided at an end portion of the base 4A in the −Z direction, swingably around the rotation axis Rx. In other words, the pair of support portions 41 that support the pendulum 5A swingably around the rotation axis Rx are provided at the end portion of the base 4A in the −Z direction. However, positions of the pair of support portions 41 are not limited thereto, and may be provided closer to the +Z direction than is the end portion of the base 4A in the −Z direction.

Figure 11:
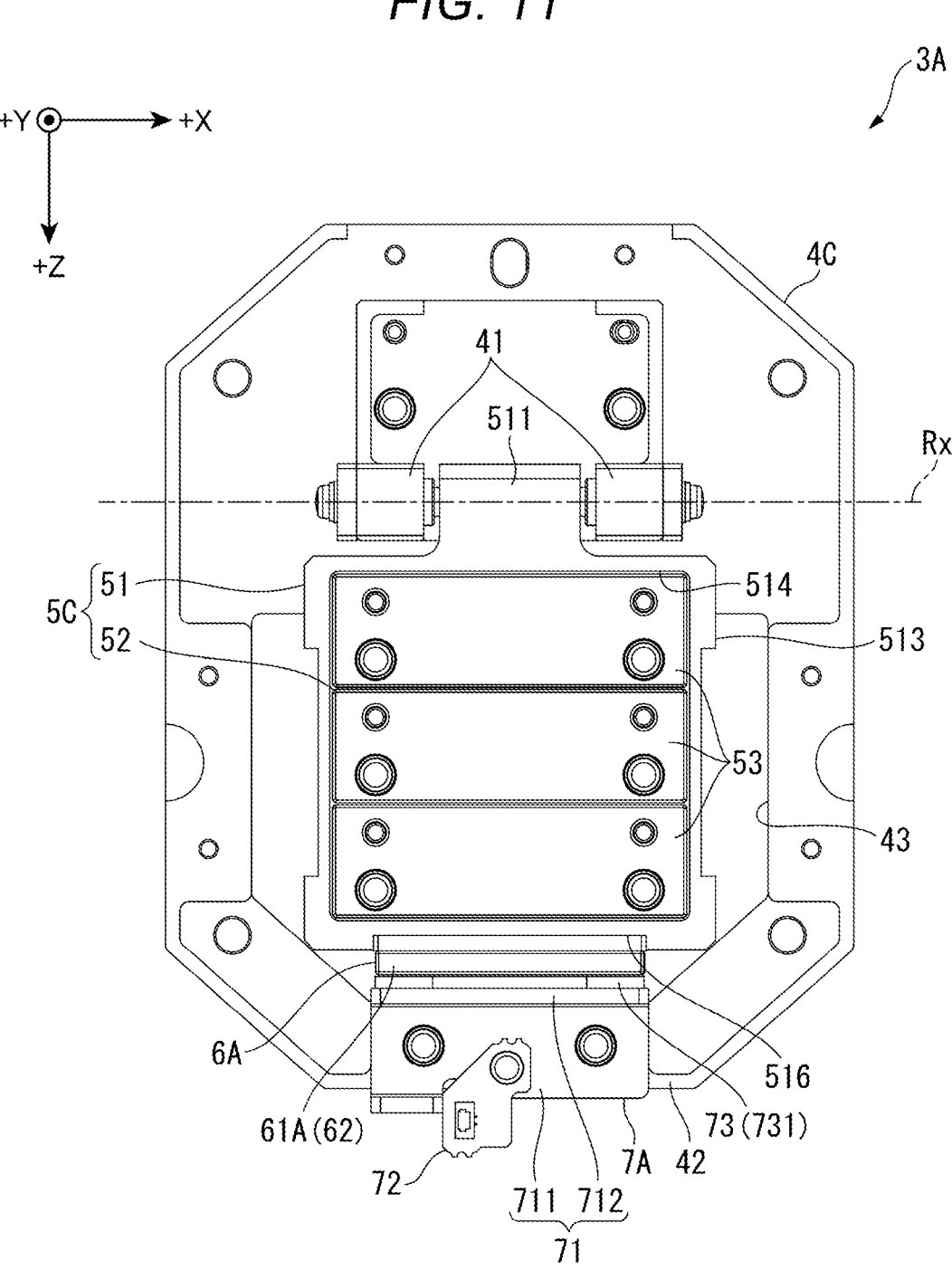
FIG. 11 is a view showing a vibration generation device according to a second modification of the first embodiment.

FIG. 11 is a plan view showing a second modification of the vibration generation device 3A. Specifically, FIG. 11 is a plan view showing a base 4C and a pendulum 5C that are deformations of the base 4A and the pendulum 5A of the vibration generation device 3A.

For example, the vibration generation device 3A may use the base 4C and the pendulum 5C shown in FIG. 11 instead of the base 4A and the pendulum 5A. The base 4C is different from the base 4A in positions of the pair of support portions 41, and the pendulum 5C is different from the pendulum 5A in a dimension between the coupling portion 511 and the enlarged portion 513.

Specifically, in the base 4C, the pair of support portions 41 are disposed closer to the +Z direction than is an end portion of the base 4C in the −Z direction. That is, the pair of support portions 41 are provided at positions between the end portion of the base 4C in the −Z direction and the relief portion 43.

Further, according to the positions of the pair of support portions 41 in the base 4C, the dimension between the coupling portion 511 and the enlarged portion 513 in the pendulum 5C is smaller than a dimension between the coupling portion 511 and the enlarged portion 513 in the pendulum 5A. That is, the pendulum 5C does not include the extending portion 512 coupled from the coupling portion 511 to the enlarged portion 513, and includes the enlarged portion 513 and a portion that is coupled to the enlarged portion 513 and supported by the pair of support portions 41. An end portion of the enlarged portion 513 in the −Z direction is adjacent to the pair of support portions 41.

According to the vibration generation device 3A in which such a base 4C and such a pendulum 5C are used, the same effects as those described above can be obtained, and a size of the vibration generation device 3A can be reduced.

Second Embodiment

Next, a second embodiment according to the present disclosure will be described.

A projector according to the embodiment has the same configuration as that of the projector 1 according to the first embodiment, and is different from the projector 1 according to the first embodiment in that a vibration generation device includes a plurality of coils and a plurality of magnets. In the following description, the same or substantially the same parts as those described above are denoted by the same reference numerals, and the description thereof will be omitted.

Figure 12:
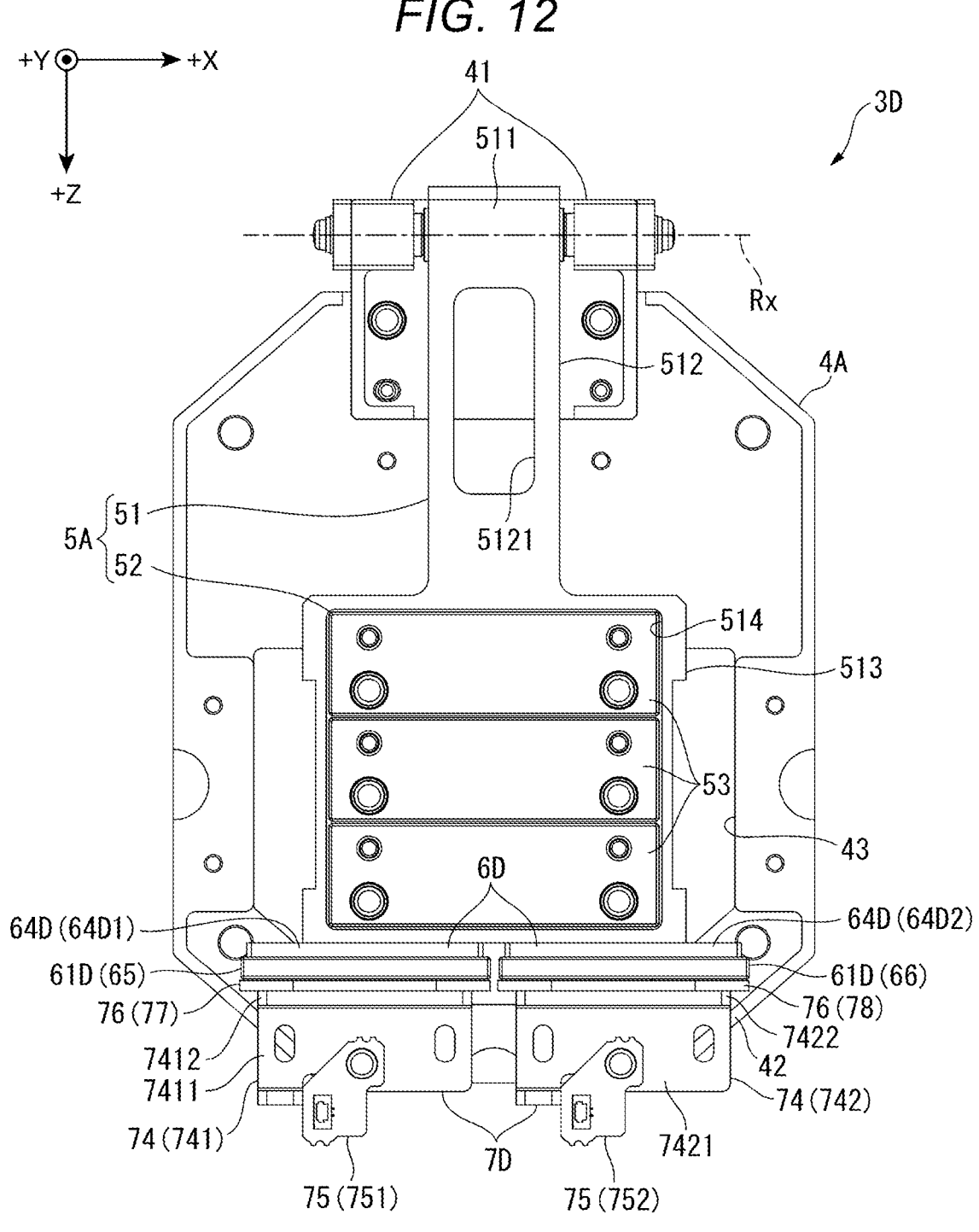
FIG. 12 is a plan view showing a vibration generation device provided in a vibration reduction device of a projector according to a second embodiment.

FIG. 12 is a plan view of a vibration generation device 3D provided in a vibration reduction device of the projector according to the embodiment as viewed from the +Y direction.

The projector according to the embodiment has the same configuration and function as those of the projector 1 according to the first embodiment except that the projector according to the embodiment includes the vibration generation device 3D shown in FIG. 12 instead of the vibration generation device 3A. That is, the vibration reduction device according to the embodiment has the same configuration and function as those of the vibration reduction device 2 according to the first embodiment except that the vibration reduction device according to the embodiment includes the vibration generation device 3D instead of the vibration generation device 3A.

The vibration generation device 3D has the same configuration and function as those of the vibration generation device 3A according to the first embodiment except that the vibration generation device 3D includes a first induction unit 6D and a first driving unit 7D instead of the first induction unit 6A and the first driving unit 7A. That is, the vibration generation device 3D includes the base 4A, the pendulum 5A, the first induction unit 6D, and the first driving unit 7D.
Configuration of First Induction Unit Similarly to the first induction unit 6A according to the first embodiment, the first induction unit 6D is provided at the end portion of the pendulum 5A in the +Z direction. The first induction unit 6D includes a magnet 61D and a plate member 64D.

The magnet 61D faces a first coil 77 and a second coil 78 to be described later in a non-contact manner. The magnet 61D includes a first magnet 65 and a second magnet 66. The second magnet 66 is disposed in parallel with the first magnet 65 in a direction along the rotation axis Rx. That is, the second magnet 66 is disposed in the +X direction with respect to the first magnet 65. Configurations of the first magnet 65 and the second magnet 66 will be described in detail later.

The plate member 64D is a member for attaching the magnet 61D to the attachment portion 516 of the pendulum 5A. The plate member 64D includes a first plate member 64D1 and a second plate member 64D2 disposed in parallel with the first plate member 64D1 in the direction along the rotation axis Rx. The first plate member 64D1 supports the first magnet 65, and the second plate member 64D2 supports the second magnet 66.

The first plate member 64D1 is a magnet-side yoke disposed on a rotation axis Rx side of the first magnet 65, and the second plate member 64D2 is a magnet-side yoke disposed on the rotation axis Rx side of the second magnet

66. That is, the vibration generation device 3D includes the first plate member 64D1 and the second plate member 64D2 that function as yokes disposed on the rotation axis Rx side of the first magnet 65 and the second magnet 66.
Configuration of First Driving unit Similarly to the first driving unit 7A according to the first embodiment, the first driving unit 7D is fixed to the base 4A and applies a driving force to the first induction unit 6D provided at the pendulum 5A to swing the pendulum 5A. The first driving unit 7D swings the pendulum 5A based on a control signal input from the operation control unit 26. The first driving unit 7D includes a holding member 74, a terminal portion 75, and a coil 76, and further includes a control unit (not shown).

The holding member 74 is fixed to the fixing portion 42 of the base 4A in a state of holding the terminal portion 75 and the coil 76. The holding member 74 includes a first holding member 741 and a second holding member 742 disposed in parallel with the first holding member 741 along the +X direction.

The first holding member 741 is formed in a substantially L shape when viewed from the −X direction. The first holding member 741 includes a first plate-shaped portion 7411 along an XZ plane, and a second plate-shaped portion 7412 standing in the +Y direction from an end portion of the first plate-shaped portion 7411 in the −Z direction along the XY plane.

A first terminal portion 751 of the terminal portion 75 is disposed at a surface of the first plate-shaped portion 7411 in the +Y direction. The first coil 77 of the coil 76 is attached to a surface of the second plate-shaped portion 7412 in the −Z direction. The second plate-shaped portion 7412 functions as a yoke for the first coil 77, that is, a coil-side yoke.

The second holding member 742 has the same configuration as that of the first holding member 741. That is, the second holding member 742 is formed in a substantially L shape when viewed from the −X direction, and includes a first plate-shaped portion 7421 similar to the first plate-shaped portion 7411 and a second plate-shaped portion 7422 similar to the second plate-shaped portion 7412.

A second terminal portion 752 of the terminal portion 75 is disposed at a surface of the first plate-shaped portion 7421 in the +Y direction. The second coil 78 of the coil 76 is attached to a surface of the second plate-shaped portion 7422 in the −Z direction. The second plate-shaped portion 7422 functions as a yoke for the second coil 78, that is, a coil-side yoke.

The vibration generation device 3D includes the second plate-shaped portions 7412 and 7422 as first yokes provided at positions on opposite side of the first coil 77 and the second coil 78 from the rotation axis Rx. The second plate-shaped portion 7412 is provided on an opposite side of the first coil 77 from the first magnet 65, and the second plate-shaped portion 7422 is provided on an opposite side of the second coil 78 from the second magnet 66.

First, the coil 76 will be described.

The coil 76 generates a magnetic field when an AC current flows from a control unit (not shown). The coil 76 includes the first coil 77 and the second coil 78 disposed in parallel with the first coil 77 along the rotation axis Rx. That is, the second coil 78 is disposed in the +X direction with respect to the first coil 77.

Figure 13:
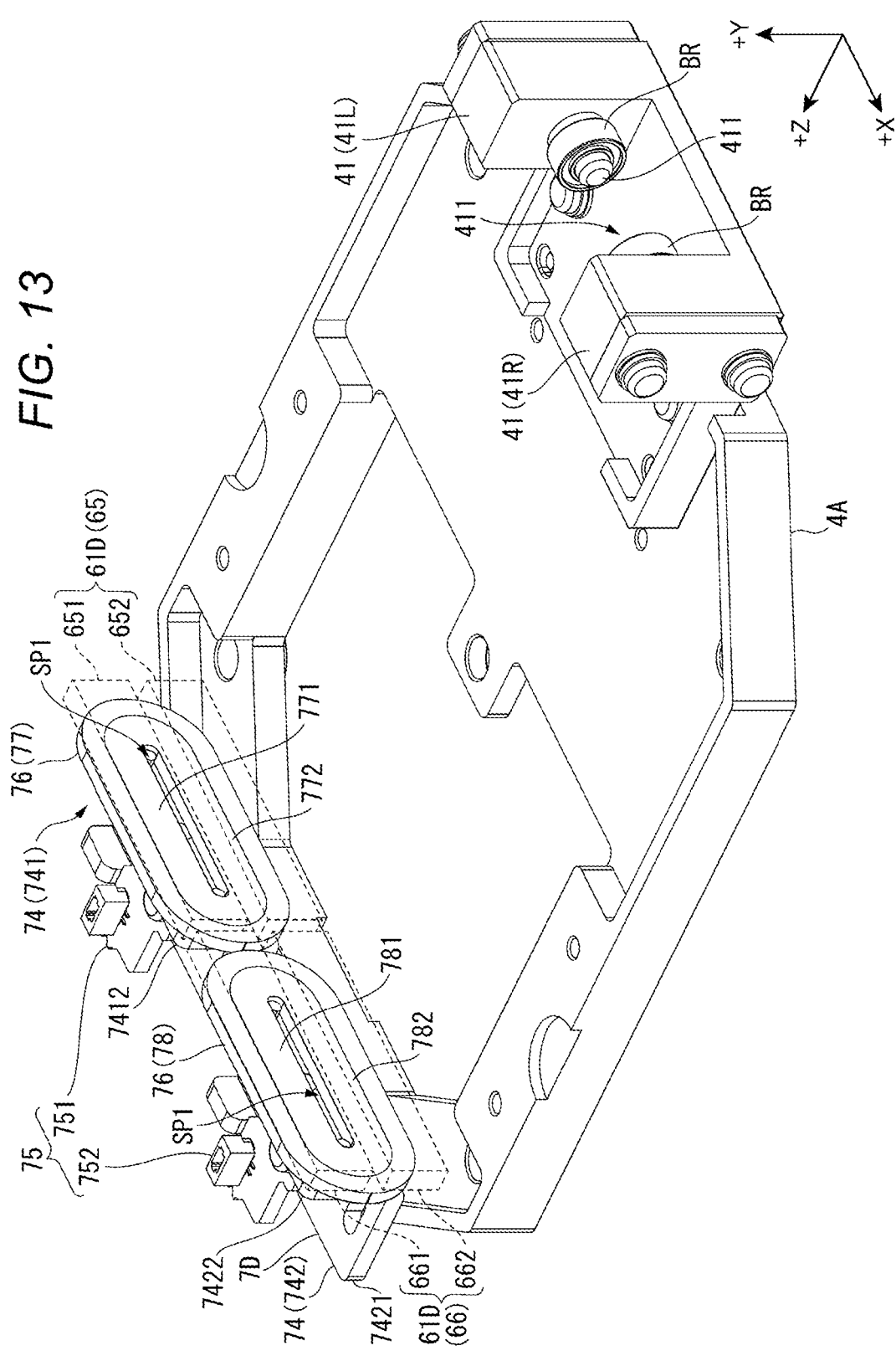
FIG. 13 is a perspective view showing the vibration generation device from which a pendulum is removed according to the second embodiment.

FIG. 13 is a perspective view showing the vibration generation device 3D in a state where the pendulum 5A is removed. In other words, FIG. 13 is a perspective view showing the first driving unit 7D.

As shown in FIG. 13, each of the first coil 77 and the second coil 78 is an air-core coil formed by winding a conductive wire in a planar manner in a track shape or an oval shape having a longitudinal axis along the +X direction when viewed from the −Z direction. A dimension of the first coil 77 along the longitudinal axis is larger than a dimension of the first coil 77 along the +Y direction orthogonal to the longitudinal axis, and a dimension of the second coil 78 along the longitudinal axis is larger than a dimension of the second coil 78 along the +Y direction orthogonal to the longitudinal axis.

Similarly to the coil 73, the first coil 77 includes a first extending portion 771 and a second extending portion 772 that extend along the +X direction which is the longitudinal axis of the first coil 77.

The first extending portion 771 is disposed in the +Y direction with respect to an air-core portion SP1 of the first coil 77. The second extending portion 772 is disposed on a side opposite from the first extending portion 771 with the air-core portion SP1 of the first coil 77 sandwiched therebetween. A dimension of the second extending portion 772 along the +X direction is substantially the same as a dimension of the first extending portion 771 along the +X direction.

In the embodiment, the second coil 78 is a coil having the same configuration and the same dimension as those of the first coil 77. That is, the second coil 78 includes a first extending portion 781 similar to the first extending portion 771 and a second extending portion 782 similar to the second extending portion 772.

The first coil 77 and the second coil 78 are the air-core coils having no core as described above, and may be coils having a core.

Similarly to the terminal portion 72 according to the first embodiment, the terminal portion 75 is electrically coupled to the operation control unit 26 of the vibration reduction device 2, and supplies a current supplied from the operation control unit 26 to the control unit. As shown in FIGS. 12 and 13, the terminal portion 75 includes the first terminal portion 751 provided at the first holding member 741 and the second terminal portion 752 provided at the second holding member 742.

As described above, the first terminal portion 751 is attached to the first plate-shaped portion 7411.

As described above, the second terminal portion 752 is attached to the first plate-shaped portion 7421.

The control unit of the first driving unit 7D generates a magnetic field by causing an AC current to flow through the coil 76, thereby swinging the pendulum 5A including the magnet 61D. At this time, the control unit causes the AC current to flow through the first coil 77 and the second coil 78 such that the first extending portions 771 and 781 have the same magnetic pole and the second extending portions 772 and 782 have the same magnetic pole.

Detailed Configurations of First Magnet and Second Magnet

As shown in FIG. 12, the first magnet 65 is disposed to face the first coil 77 in a non-contact manner, and the second magnet 66 is disposed to face the second coil 78 in a non-contact manner.

Similarly to the magnet 61A, the first magnet 65 includes a first magnet member 651 and a second magnet member 652. Each of the first magnet member 651 and the second magnet member 652 is formed in a substantially rectangular parallelepiped shape having a longitudinal axis along the +X direction.

The first magnet member 651 is disposed to face the first extending portion 771 of the first coil 77.

The second magnet member 652 is disposed to be separated from the first magnet member 651 in the −Y direction, and is disposed to face the second extending portion 772 of the first coil 77.

A magnetic pole of a surface of the first magnet member 651 facing the first extending portion 771 is different from a magnetic pole of a surface of the second magnet member 652 facing the second extending portion 772. For example, the magnetic pole of the surface of the first magnet member 651 facing the first extending portion 771 is an S pole, and the magnetic pole of the surface of the second magnet member 652 facing the second extending portion 772 is an N pole.

Similarly to the first magnet 65, the second magnet 66 includes a first magnet member 661 and a second magnet member 662. Each of the first magnet member 661 and the second magnet member 662 is formed in a substantially rectangular parallelepiped shape having a longitudinal axis along the +X direction.

The first magnet member 661 is disposed to face the first extending portion 781 of the second coil 78.

The second magnet member 662 is disposed to be separated from the first magnet member 661 in the −Y direction, and is disposed to face the second extending portion 782 of the second coil 78.

A magnetic pole of a surface of the first magnet member 661 facing the first extending portion 781 is different from a magnetic pole of a surface of the second magnet member 662 facing the second extending portion 782. For example, the magnetic pole of the surface of the first magnet member 661 facing the first extending portion 781 is an S pole, and the magnetic pole of the surface of the second magnet member 662 facing the second extending portion 782 is an N pole.

In the embodiment, the magnetic pole of the surface of the first magnet member 651 facing the first extending portion 771 is the same as the magnetic pole of the surface of the first magnet member 661 facing the first extending portion 781. Further, the magnetic pole of the surface of the second magnet member 652 facing the second extending portion 772 is the same as the magnetic pole of the surface of the second magnet member 662 facing the second extending portion 782.

As described above, the control unit of the first driving unit 7D causes the AC current to flow through the first coil 77 and the second coil 78 such that the first extending portions 771 and 781 have the same magnetic pole and the second extending portions 772 and 782 have the same magnetic pole.

Accordingly, the pendulum 5A can be swung around the rotation axis Rx while preventing the magnetic field generated by the first coil 77 and the magnetic field generated by the second coil 78 from interfering with each other.

For example, when the first coil 77 and the second coil 78 are sufficiently separated from each other, the control unit may cause the AC current to flow through the first coil 77 and the second coil 78 such that the first extending portions 771 and 781 have different magnetic poles and the second extending portions 772 and 782 have different magnetic poles.

In this case, the magnetic pole of the surface of the first magnet member 651 facing the first extending portion 771 may be different from the magnetic pole of the surface of the first magnet member 661 facing the first extending portion 781, and the magnetic pole of the surface of the second magnet member 652 facing the second extending portion 772 may be different from the magnetic pole of the surface of the second magnet member 662 facing the second extending portion 782.

Effects of Second Embodiment

The projector according to the embodiment described above has the following effects in addition to the same effects as those of the projector 1 according to the first embodiment.

In the vibration generation device 3D, the first driving unit 7D includes the first coil 77 and the second coil 78. The second coil 78 is disposed in parallel with the first coil 77 in the +X direction along the rotation axis Rx. The magnet 61D of the first induction unit 6D faces the first coil 77 and the second coil 78 in a non-contact manner.

According to such a configuration, a magnetic field acting on the magnet 61D provided at the pendulum 5A can be increased. Therefore, vibration generated by the swing of the pendulum 5A can be increased.

In the vibration generation device 3D, the first induction unit 6D includes the first magnet 65 and the second magnet 66 as the magnet 61D of the first induction unit 6D. The first magnet 65 is disposed to face the first coil 77, and the second magnet 66 is disposed to be separated from and in parallel with the first magnet 65 in the +X direction along the rotation axis Rx and is disposed to face the second coil 78.

According to such a configuration, a rotational torque when the pendulum 5A including the first magnet 65 and the second magnet 66 swings can be increased. Therefore, the vibration generated by the swing of the pendulum 5A can be increased.

Modification of Second Embodiment

In the vibration generation device 3D described above, the magnet 61D includes the first magnet 65 facing the first coil 77 in a non-contact manner and the second magnet 66 facing the second coil 78 in a non-contact manner. The first magnet 65 includes the first magnet member 651 facing the first extending portion 771 and the second magnet member 652 disposed to be separated from the first magnet member 651 in the −Y direction and facing the second extending portion 772. The second magnet 66 includes the first magnet member 661 facing the first extending portion 781 and the second magnet member 662 disposed to be separated from the first magnet member 661 in the −Y direction and facing the second extending portion 782. However, the vibration generation device 3D is not limited thereto, and another magnet may be used instead of the magnet 61D.

First Modification of Second Embodiment

Figure 14:
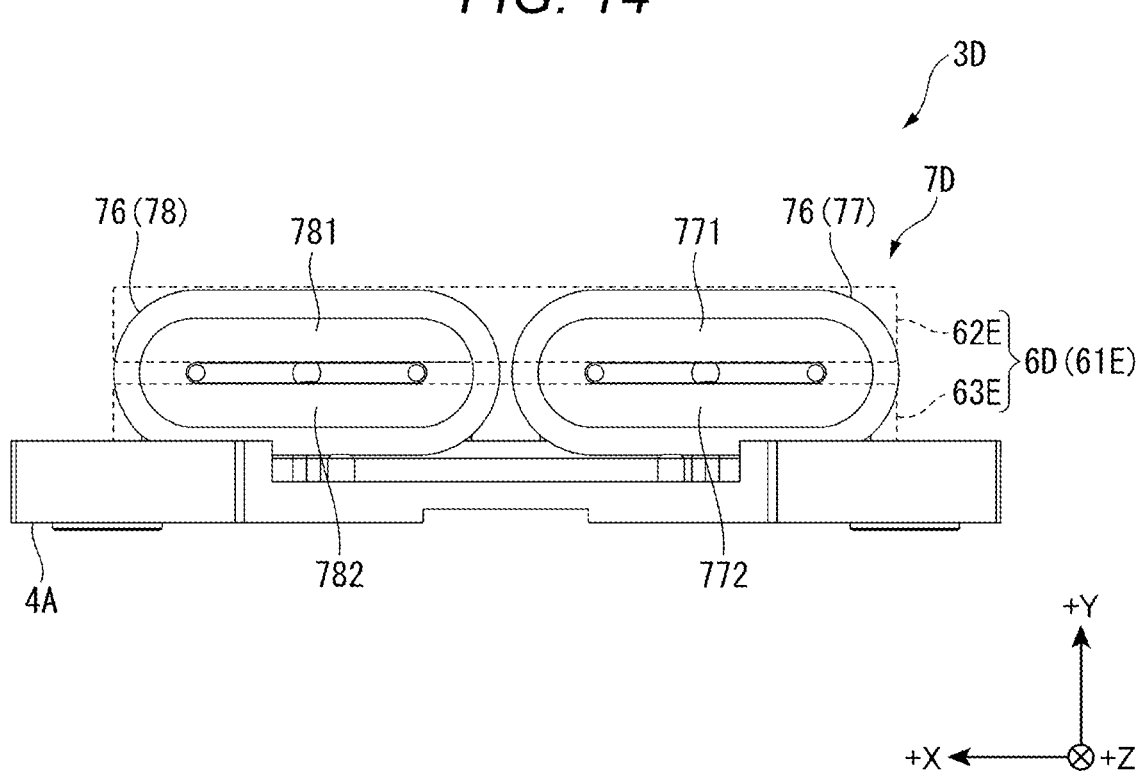
FIG. 14 is a view showing a vibration generation device according to a first modification of the second embodiment.

FIG. 14 is a view showing a first modification of the vibration generation device 3D. Specifically, FIG. 14 is a view showing a magnet 61E that is a deformation of the magnet 61D of the vibration generation device 3D.

For example, the vibration generation device 3D may use the magnet 61E shown in FIG. 14 as a magnet of the first induction unit 6D instead of the magnet 61D. Unlike the magnet 61D including the first magnet 65 and the second magnet 66, the magnet 61E includes a first magnet member 62E and a second magnet member 63E.

Each of the first magnet member 62E and the second magnet member 63E is formed in a substantially rectangular parallelepiped shape having a longitudinal axis along the +X direction, and a dimension of the first magnet member 62E along the +X direction and a dimension of the second magnet member 63E along the +X direction substantially coincide with a dimension from an end portion of the first coil 77 in the −X direction to an end portion of the second coil 78 in the +X direction.

The first magnet member 62E is disposed across the first extending portion 771 of the first coil 77 and the first extending portion 781 of the second coil 78, and the second magnet member 63E is disposed across the second extending portion 772 of the first coil 77 and the second extending portion 782 of the second coil 78. A magnetic pole of a surface of the first magnet member 62E facing the first extending portions 771 and 781 is different from a magnetic pole of a surface of the second magnet member 63E facing the second extending portions 772 and 782. For example, the magnetic pole of the surface of the first magnet member 62E facing the first extending portions 771 and 781 is an S pole, and the magnetic pole of the surface of the second magnet member 63E facing the second extending portions 772 and 782 is an N pole.

The vibration generation device 3D using such a magnet 61E can also achieve the same effects as those described above.

Second Modification of Second Embodiment

Figure 15:
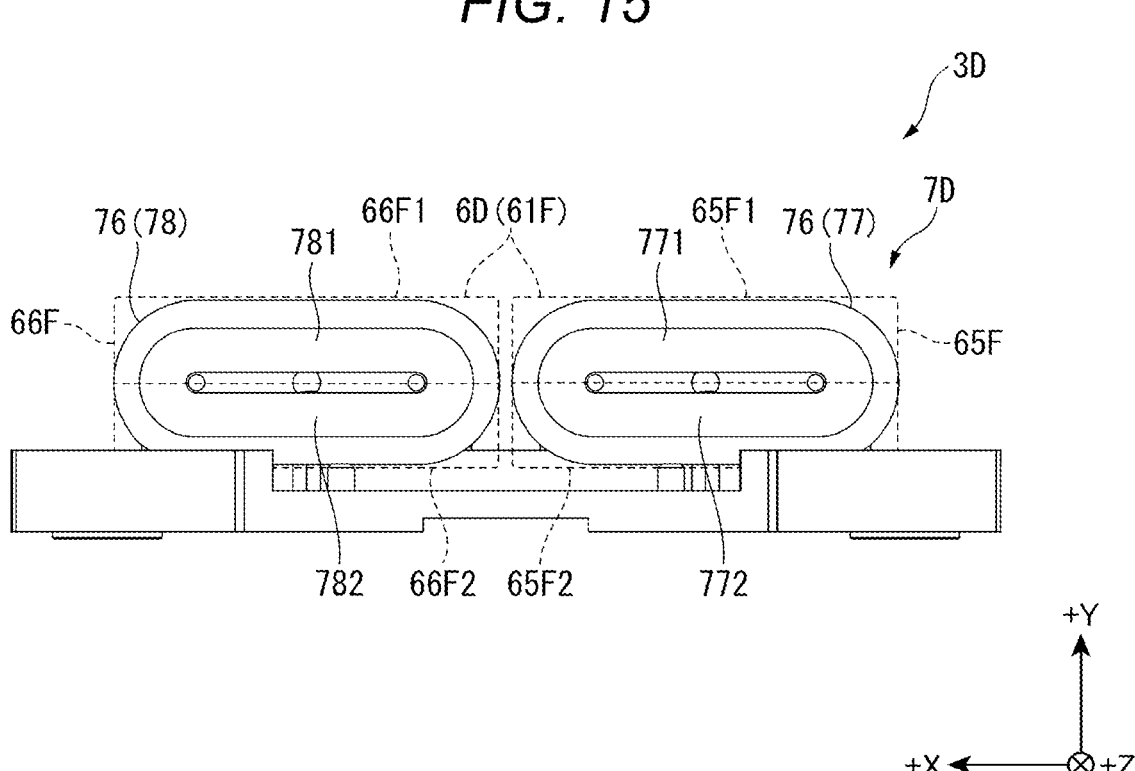
FIG. 15 is a view showing a vibration generation device according to a second modification of the second embodiment.

FIG. 15 is a view showing a second modification of the vibration generation device 3D. Specifically, FIG. 15 is a view showing a magnet 61F that is a deformation of the magnet 61D of the vibration generation device 3D.

For example, the vibration generation device 3D may use the magnet 61F shown in FIG. 15 as a magnet of the first induction unit 6D instead of the magnet 61D. Unlike the magnet 61D including the first magnet 65 and the second magnet 66, the magnet 61F includes a first magnet 65F and a second magnet 66F.

Each of the first magnet 65F and the second magnet 66F is formed in a substantially rectangular parallelepiped shape having a longitudinal axis along the +X direction, a dimension of the first magnet 65F along the +X direction substantially coincides with a dimension of the first coil 77 along the +X direction, and a dimension of the second magnet 66F along the +X direction substantially coincides with a dimension of the second coil 78 along the +X direction. A dimension of the first magnet 65F along the +Y direction substantially coincides with a dimension of the first coil 77 along the +Y direction, and a dimension of the second magnet 66F along the +Y direction substantially coincides with a dimension of the second coil 78 along the +Y direction.

The first magnet 65F faces the first coil 77 in a non-contact manner. The first magnet 65F includes a portion 65F1 facing the first extending portion 771 of the first coil 77 and a portion 65F2 facing the second extending portion 772 of the first coil 77. A magnetic pole of a surface of the portion 65F1 facing the first extending portion 771 is different from a magnetic pole of a surface of the portion 65F2 facing the second extending portion 772. For example, the magnetic pole of the surface of the portion 65F1 facing the first extending portion 771 is an S pole, and the magnetic pole of the surface of the portion 65F2 facing the second extending portion 772 is an N pole.

The second magnet 66F faces the second coil 78 in a non-contact manner. The second magnet 66F includes a portion 66F1 facing the first extending portion 781 of the second coil 78 and a portion 66F2 facing the second extending portion 782 of the second coil 78. A magnetic pole of a surface of the portion 66F1 facing the first extending portion 781 is different from a magnetic pole of a surface of the portion 66F2 facing the second extending portion 782. For example, the magnetic pole of the surface of the portion 66F1 facing the first extending portion 781 is an S pole, and the magnetic pole of the surface of the portion 66F2 facing the second extending portion 782 is an N pole.

The vibration generation device 3D using such a magnet 61F can also achieve the same effects as those described above.

As described above, according to a direction of a current flowing through the first coil 77 and the second coil 78, the magnetic pole of the surface of the portion 65F1 facing the first extending portion 771 may be different from the magnetic pole of the surface of the portion 66F1 facing the first extending portion 781, and the magnetic pole of the surface of the portion 65F2 facing the second extending portion 772 may be different from the magnetic pole of the surface of the portion 66F2 facing the second extending portion 782.

Third Modification of Second Embodiment

Figure 16:
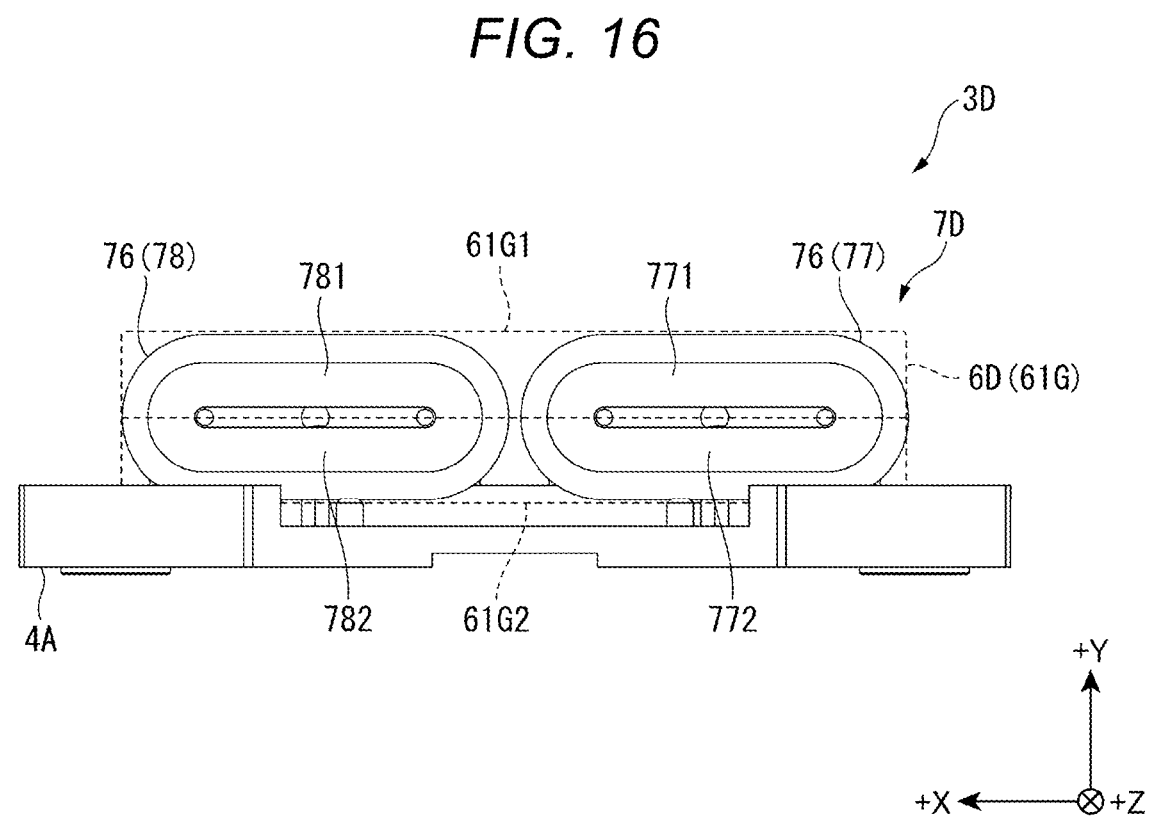

FIG. 16 is a view showing a third modification of the vibration generation device 3D. Specifically, FIG. 16 is a view showing a magnet 61G that is a deformation of the magnet 61D of the vibration generation device 3D.

For example, the vibration generation device 3D may use the magnet 61G shown in FIG. 16 as a magnet of the first induction unit 6D instead of the magnet 61D. Unlike the magnet 61D including the first magnet 65 and the second magnet 66, the magnet 61G is a single magnet member.

The magnet 61G is formed in a substantially rectangular parallelepiped shape having a longitudinal axis along the +X direction. A dimension of the magnet 61G along the +X direction substantially coincides with a dimension from an end portion of the first coil 77 in the −X direction to an end portion of the second coil 78 in the +X direction, and a dimension of the magnet 61G along the +Y direction substantially coincides with a dimension of the first coil 77 and the second coil 78 along the +Y direction.

The magnet 61G includes a portion 61G1 facing the first extending portion 771 of the first coil 77 and the first extending portion 781 of the second coil 78 and a portion 61G2 facing the second extending portion 772 of the first coil 77 and the second extending portion 782 of the second coil 78. A magnetic pole of a surface of the portion 61G1 facing the first extending portions 771 and 781 is different from a magnetic pole of a surface of the portion 61G2 facing the second extending portions 772 and 782. For example, the magnetic pole of the surface of the portion 61G1 facing the first extending portions 771 and 781 is an S pole, and the magnetic pole of the surface of the portion 61G2 facing the second extending portions 772 and 782 is an N pole.

The vibration generation device 3D using such a magnet 61G can also achieve the same effects as those described above.

Other Modifications of Second Embodiment

The vibration generation device 3D described above includes the base 4A and the pendulum 5A. However, the vibration generation device 3D is not limited thereto, and may include the base 4C and the pendulum 5C instead of the base 4A and the pendulum 5A.

Third Embodiment

Next, a third embodiment according to the present disclosure will be described.

A projector according to the embodiment has the same configuration as that of the projector 1 according to the first embodiment, and is different from the projector 1 according to the first embodiment in that the projector further includes a second induction unit and a second driving unit. In the following description, the same or substantially the same parts as those described above are denoted by the same reference numerals, and the description thereof will be omitted.

Figure 17:
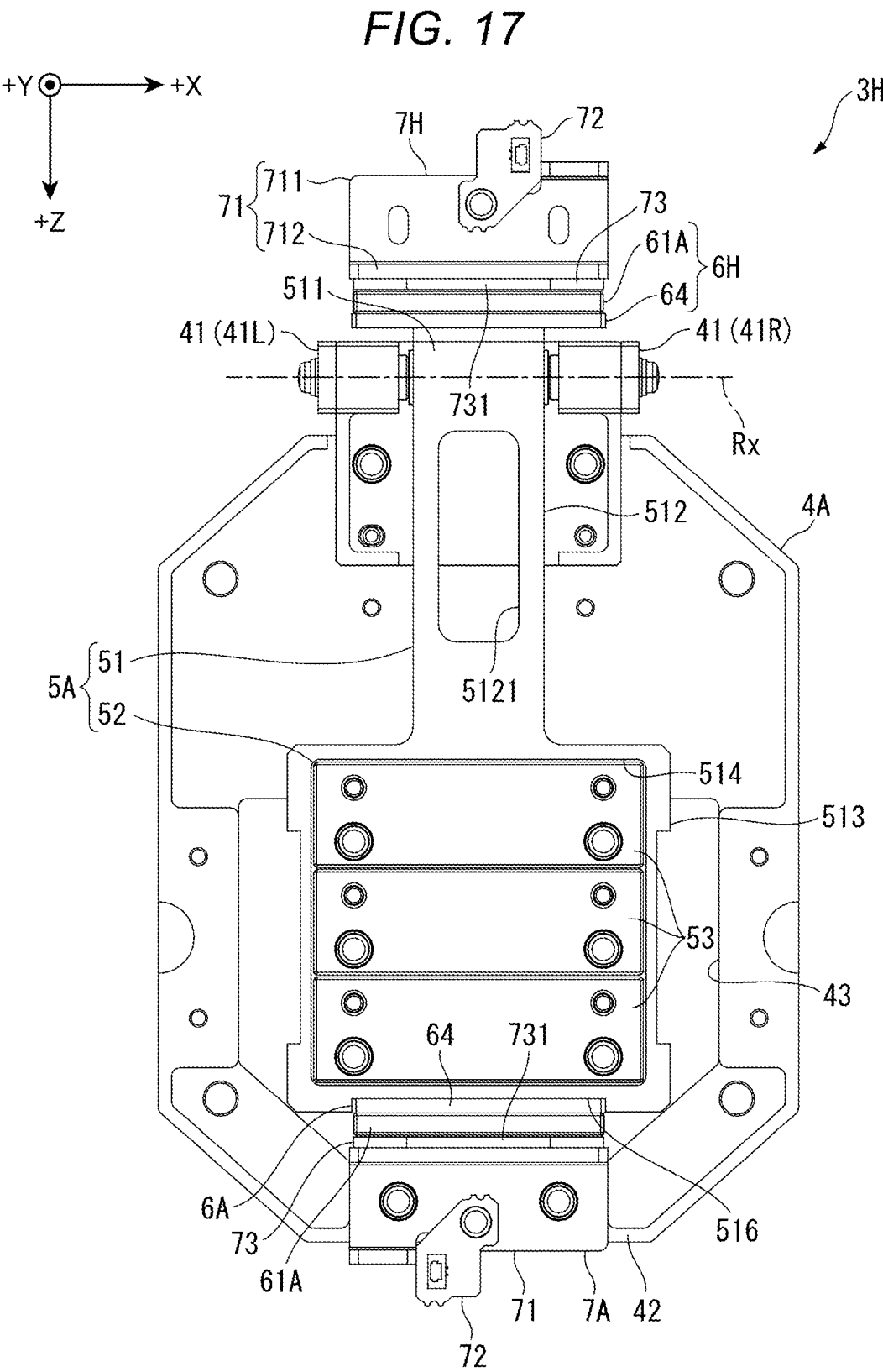
FIG. 17 is a plan view showing a vibration generation device provided in a vibration reduction device of a projector according to a third embodiment.

FIG. 17 is a plan view of a vibration generation device 3H provided in a vibration reduction device of the projector according to the embodiment as viewed from the +Y direction.

The projector according to the embodiment has the same configuration and function as those of the projector 1 according to the first embodiment except that the projector according to the embodiment includes the vibration generation device 3H shown in FIG. 17 instead of the vibration generation device 3A. That is, the vibration reduction device according to the embodiment has the same configuration and function as those of the vibration reduction device 2 according to the first embodiment except that the vibration reduction device according to the embodiment includes the vibration generation device 3H instead of the vibration generation device 3A.

The vibration generation device 3H has the same configuration and function as those of the vibration generation device 3A according to the first embodiment except that a second induction unit 6H and a second driving unit 7H are further provided. That is, the vibration generation device 3H includes the base 4A, the pendulum 5A, the first induction unit 6A, the first driving unit 7A, the second induction unit 6H, and the second driving unit 7H. Specifically, in addition to the same configuration as that of the vibration generation device 3A according to the first embodiment, the vibration generation device 3H further includes the second induction unit 6H and the second driving unit 7H in order to apply a driving force for swinging the pendulum 5A at an end portion of the pendulum 5A in the −Z direction.

Configuration of Second Induction Unit

The second induction unit 6H is provided at the end portion of the pendulum 5A in the −Z direction. That is, the second induction unit 6H is provided at an end portion of the pendulum 5A on an opposite side of the rotation axis Rx from the first induction unit 6A. Similarly to the first induction unit 6A, the second induction unit 6H includes the magnet 61A and the plate member 64.

In the second induction unit 6H, the plate member 64 is provided adjacent to the pair of support portions 41 at the end portion of the pendulum 5A in the −Z direction. At a surface of the plate member 64 facing the −Z direction, the first magnet member 62 and the second magnet member 63 constituting the magnet 61A (not shown in FIG. 17) are disposed along the +X direction that is a longitudinal axis. As described above, the plate member 64 is a magnet-side yoke that functions as a yoke for the magnet 61A.

The second driving unit 7H is provided in the −Z direction with respect to the second induction unit 6H. Similarly to the first driving unit 7A, the second driving unit 7H includes the holding member 71, the terminal portion 72, and the coil 73, and further includes a control unit (not shown).

The holding member 71 holds the terminal portion 72 and the coil 73. In the embodiment, the holding member 71 is fixed to the frame 23 shown in FIG. 3. However, the holding member 71 is not limited thereto, and a fixing portion to which the holding member 71 is fixed may be provided at the base 4A by extending the base 4A in the −Z direction or the like.

As described above, the coil 73 is an air-core coil formed by winding a conductive wire in a planar manner in a track shape or an oval shape having a longitudinal axis in the +X direction. Although not shown in FIG. 17, the first magnet member 62 of the second induction unit 6H is disposed to face the first extending portion 731 of the coil 73 in a non-contact manner. The second magnet member 63 of the second induction unit 6H is separated from the first magnet member 62 of the second induction unit 6H in the −Y direction, and is disposed to face the second extending portion 732 of the coil 73 in a non-contact manner.

In the embodiment, although not shown in detail, a magnetic pole of a surface of the first magnet member 62 facing the first extending portion 731 in the second induction unit 6H is the same as a magnetic pole of a surface of the first magnet member 62 facing the first extending portion 731 in the first induction unit 6A. A magnetic pole of a surface of the second magnet member 63 facing the second extending portion 732 in the second induction unit 6H is the same as a magnetic pole of a surface of the second magnet member 63 facing the second extending portion 732 in the first induction unit 6A. Therefore, the control unit of the second driving unit 7H causes an AC current opposite in phase from an AC current, which is caused by a control unit of the first induction unit 6A to flow through the coil 73, to flow through the coil 73 of the second driving unit 7H. Accordingly, the pendulum 5A can be swung around the rotation axis Rx.

When the magnetic pole of the surface of the first magnet member 62 facing the first extending portion 731 in the second induction unit 6H is different from the magnetic pole of the surface of the first magnet member 62 facing the first extending portion 731 in the first induction unit 6A, and the magnetic pole of the surface of the second magnet member 63 facing the second extending portion 732 in the second induction unit 6H is different from the magnetic pole of the surface of the second magnet member 63 facing the second extending portion 732 in the first induction unit 6A, the control unit of the second driving unit 7H may cause an AC current the same in phase as that of the AC current, which is caused to flow through the coil 73 of the first driving unit 7A by the control unit, to flow through the coil 73 of the second driving unit 7H. In this case, the pendulum 5A can also be swung around the rotation axis Rx.

The projector according to the embodiment described above can achieve the same effects as those of the projector 1 according to the first embodiment.

The first driving unit 7A and the second driving unit 7H may share a control unit.

Modification of Third Embodiment

In the vibration generation device 3H described above, the second induction unit 6H is provided at the end portion of the pendulum 5A in the −Z direction. However, the second induction unit 6H is not limited thereto, and may be provided at an end portion of the pendulum 5C in the −Z direction described as the second modification of the first embodiment.

The vibration generation device 3H may use another first induction unit and another first driving unit described above instead of the first induction unit 6A and the first driving unit 7A. In addition, the vibration generation device 3H may use a second induction unit and a second driving unit having the same configurations as those of another first induction unit and another first driving unit described above instead of the second induction unit 6H and the second driving unit 7H.

Fourth Embodiment

Next, a fourth embodiment according to the present disclosure will be described.

A projector according to the embodiment has the same configuration as that of the projector 1 according to the first embodiment, and a configuration of a vibration generation device is different. In the following description, the same or substantially the same parts as those described above are denoted by the same reference numerals, and the description thereof will be omitted.

Figure 18:
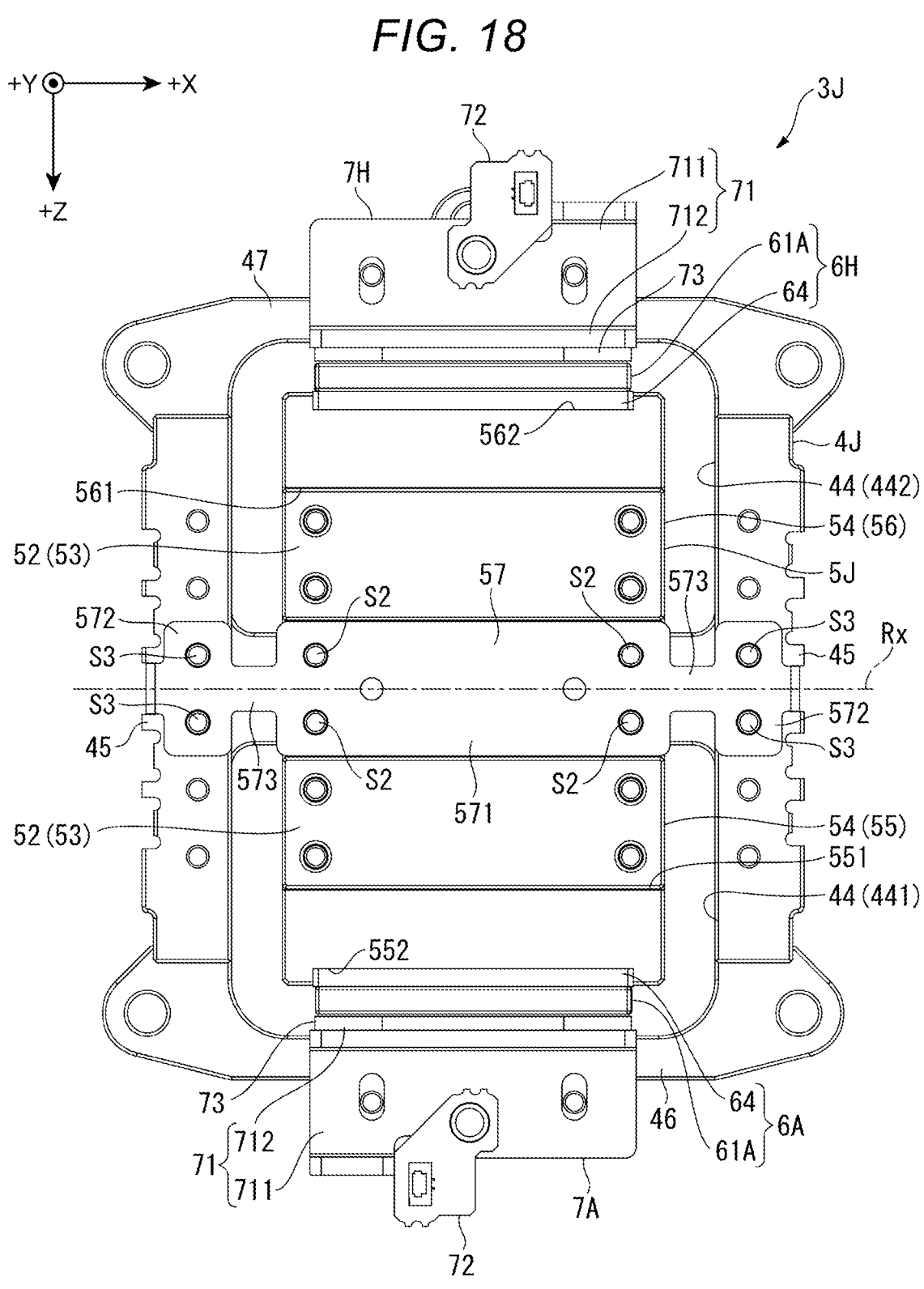
FIG. 18 is a plan view showing a vibration generation device provided in a vibration reduction device of a projector according to a fourth embodiment.
Figure 19:
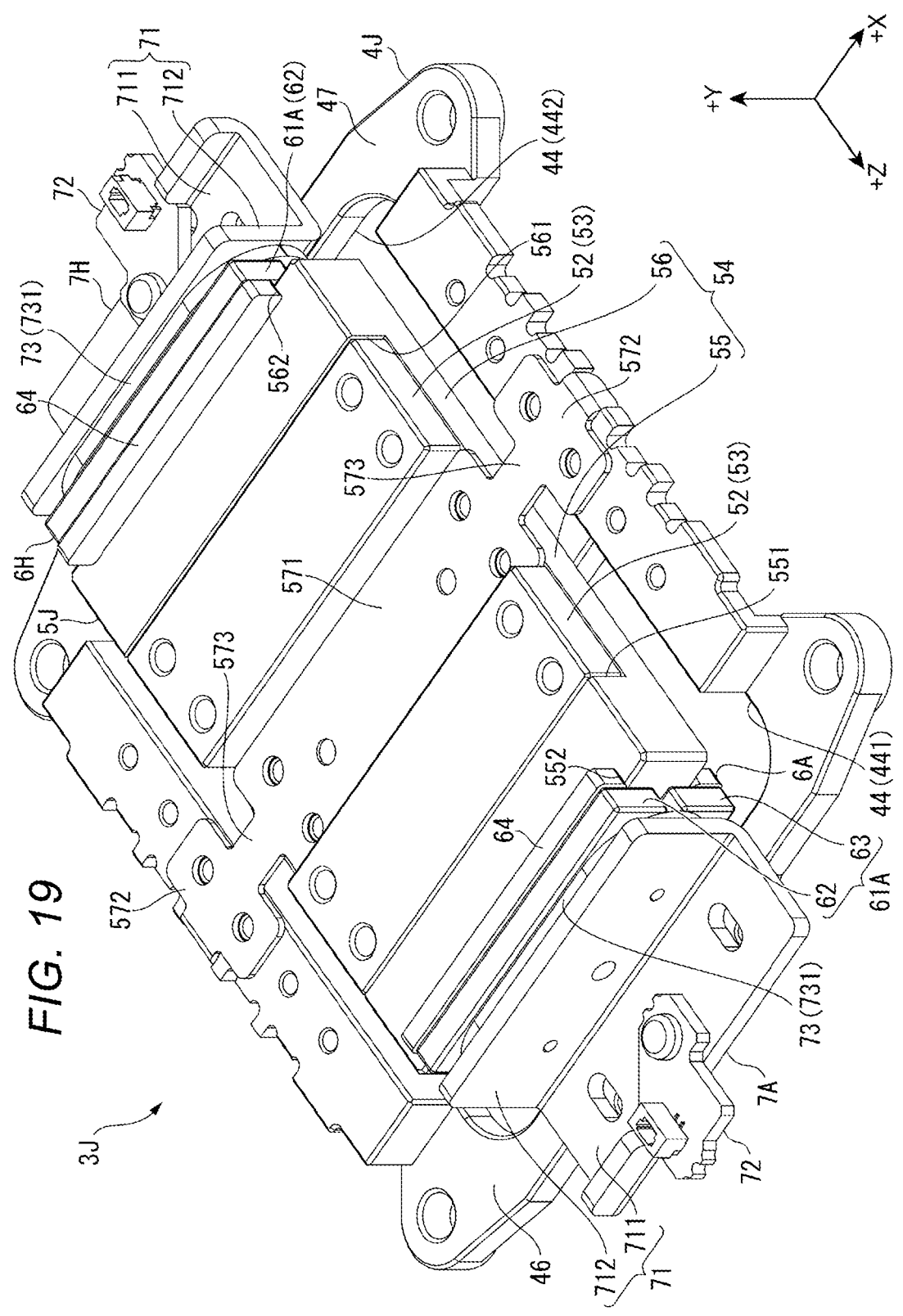
FIG. 19 is a perspective view showing the vibration generation device according to the fourth embodiment.

FIG. 18 is a plan view of a vibration generation device 3J provided in a vibration reduction device of the projector according to the embodiment as viewed from the +Y direction. FIG. 19 is a perspective view showing the vibration generation device 3J.

The projector according to the embodiment has the same configuration and function as those of the projector 1 according to the first embodiment except that the projector according to the embodiment includes the vibration generation device 3J shown in FIGS. 18 and 19 instead of the vibration generation device 3A. That is, the vibration reduction device according to the embodiment has the same configuration and function as those of the vibration reduction device 2 according to the first embodiment except that the vibration reduction device according to the embodiment includes the vibration generation device 3J instead of the vibration generation device 3A.

The vibration generation device 3J includes a base 4J, a pendulum 5J, the first induction unit 6A, the first driving unit 7A, the second induction unit 6H, and the second driving unit 7H, and has the same configuration and function as those of the vibration generation device 3A according to the first embodiment.

Configuration of Base

The base 4J is formed in a rectangular frame shape that is long in the +Z direction when viewed from the +Y direction. The base 4J includes a relief portion 44, a pair of support portions 45, a first attachment portion 46, and a second attachment portion 47.

Similarly to the relief portion 43 according to the first and second embodiments, the relief portion 44 is a portion for preventing the pendulum 5J from coming into contact with the base 4J when the pendulum 5J swings around the rotation axis Rx. Specifically, the relief portion 44 includes, when viewed from the +Y direction, a first relief portion 441 provided in a portion of the base 4J in the +Z direction and a second relief portion 442 provided in a portion of the base 4J in the −Z direction.

The first relief portion 441 is an opening for preventing a portion of the pendulum 5J in the +Z direction and the first induction unit 6A from coming into contact with the base 4J. The second relief portion 442 is an opening for preventing a portion of the pendulum 5J in the −Z direction and the second induction unit 6H from coming into contact with the base 4J.

However, the relief portion 44 is not limited to such a configuration, and may be a single opening. In addition, the relief portion 44 may be a recess that opens in the +Y direction or the −Y direction that is a direction opposite from a direction facing the pendulum 5J. In this case, at least one of the first relief portion 441 and the second relief portion 442 may be a recess.

The pair of support portions 45 are provided at a center of the base 4J in the +Y direction and at both ends of the base 4J in the +X direction. The pair of support portions 45 support both ends of a plate member 57 in the +X direction.

The first attachment portion 46 is provided at a center of an end portion of the base 4J in the +Z direction. The first driving unit 7A is attached to the first attachment portion 46.

The second attachment portion 47 is provided at a center of an end portion of the base 4J in the −Z direction. The second driving unit 7H is attached to the second attachment portion 47.

Configuration of Pendulum

The pendulum 5J holds the first induction unit 6A and the second induction unit 6H, and swings around the rotation axis Rx by the first driving unit 7A that applies a magnetic force to the first induction unit 6A and the second driving unit 7H that applies a magnetic force to the second induction unit 6H, thereby generating vibration. The pendulum 5J includes the weight portion 52, an arm 54, and the plate member 57.

The arm 54 integrally includes a first arm 55 extending from the rotation axis Rx of the pendulum 5J in the +Z direction and a second arm 56 extending from the rotation axis Rx in the −Z direction. That is, the arm 54 includes the first arm 55 and the second arm 56 that extend in opposite directions, with the rotation axis Rx as a center, along a direction orthogonal to the rotation axis Rx. That is, the arm 54 includes the first arm 55 extending from the rotation axis Rx toward the first driving unit 7A side and the second arm 56 extending from the rotation axis Rx toward a side opposite from the first arm 55.

The first arm 55 includes a first disposition portion 551 and a first attachment portion 552.

The first disposition portion 551 is provided at a position separated from the rotation axis Rx toward the first driving unit 7A side at a surface of the first arm 55 facing the +Y direction, and is a disposition portion in which the weight portion members 53 is disposed. In the first disposition portion 551, the weight portion member 53 can be disposed such that a longitudinal axis thereof is along the +X direction. In the embodiment, the number of weight portion members 53 that can be disposed in the first disposition portion 551 is one, and a plurality of weight portion members 53 can be stacked along the +Y direction. However, the number of weight portion members 53 that can be disposed in the first disposition portion 551 can be changed as appropriate, and the first arm 55 may be provided with a disposition portion in which the weight portion member 53 can be disposed at a surface of the first arm 55 facing the −Y direction instead of or in addition to the first disposition portion 551.

The first attachment portion 552 is provided at an end portion of the first arm 55 in the +Z direction. The first attachment portion 552 has the same configuration as that of the attachment portion 516, and the plate member 64 provided in the first induction unit 6A is attached to the first attachment portion 552.

The second arm 56 includes a second disposition portion 561 and a second attachment portion 562.

The second disposition portion 561 has the same configuration as that of the first disposition portion 551. That is, the second disposition portion 561 is provided at a position separated from the rotation axis Rx toward the second driving unit 7H side at a surface of the second arm 56 facing the +Y direction, and is a disposition portion in which the weight portion member 53 is disposed. The number of weight portion members 53 that can be disposed in the second disposition portion 561 can be changed as appropriate, and the second arm 56 may be provided with a disposition portion in which the weight portion member 53 can be disposed at a surface of the second arm 56 facing the −Y direction instead of or in addition to the second disposition portion 561.

The second attachment portion 562 is provided at an end portion of the second arm 56 in the −Z direction. The plate member 64 provided in the second induction unit 6H is attached to the second attachment portion 562.

In the pendulum 5J, the weight portion 52 includes a first weight portion formed by the weight portion member 53 provided at the first arm 55 and a second weight portion formed by the weight portion member 53 provided at the second arm 56.

The plate member 57 is fixed to the base 4J along the +X direction, and constitutes the rotation axis Rx of the pendulum 5J. The plate member 57 includes a fixing portion 571, a pair of attachment portions 572, and a pair of torsion portions 573.

The fixing portion 571 is a portion of the plate member 57 that is fixed to the arm 54. The fixing portion 571 is provided at a center of the plate member 57 in the +X direction. The fixing portion 571 is disposed at the arm 54 to straddle a part of the first arm 55 and a part of the second arm 56, and is fixed to the arm 54 by screws S2.

The pair of attachment portions 572 are provided at positions sandwiching the fixing portion 571 in the +X direction.

Each of the pair of attachment portions 572 is attached to the corresponding support portion 45 in the pair of support portions 45. The pair of attachment portions 572 are fixed to the pair of support portions 45 by screws S3.

The pair of torsion portions 573 are disposed between the fixing portion 571 and the pair of attachment portions 572.

Specifically, one torsion portion 573 in the pair of torsion portions 573 is provided between the fixing portion 571 and the attachment portion 572 of the pair of attachment portions 572 in the +X direction, and the other torsion portion 573 is provided between the fixing portion 571 and the attachment portion 572 of the pair of attachment portions 572 in the −X direction.

Each of the pair of torsion portions 573 linearly extends along the +X direction.

When the pendulum 5J is swung by the first driving unit 7A and the second driving unit 7H, the pair of torsion portions 573 are twisted around an axis along the +X direction, thereby enabling swing of the pendulum 5J. That is, an extension line of an axis coupling the pair of torsion portions 573 is the rotation axis Rx of the pendulum 5J.

Operation of Vibration Generation Device

In the vibration generation device 3J described above, similarly to the pendulum 5A in the vibration generation device 3H according to the second embodiment, the pendulum 5J swings around the rotation axis Rx by the first driving unit 7A and the second driving unit 7H. The vibration generated by the vibration generation device 3J is vibration opposite in phase from vibration of the lens barrel 121 which is the vibration reduction target. Accordingly, the vibration of the lens barrel 121 is reduced by the vibration reduction device 2 including the vibration generation device 3J.

When the weight portion members 53 at the first disposition portion 551 and the second disposition portion 561 are disposed at positions to be separated from the rotation axis Rx of the pendulum 5J, a driving force of the pendulum 5J can be increased. A position of the weight portion member 53 at the first disposition portion 551 from the rotation axis Rx and a position of the weight portion member 53 at the second disposition portion 561 from the rotation axis Rx are disposed symmetrically with respect to the rotation axis Rx, and a position of a center of gravity of the pendulum 5J is disposed at the rotation axis Rx, and therefore the pendulum 5J can be stably swung. In addition, the weight portion members 53 are not limited to be disposed symmetrically, and the positions or the number of the weight portion members 53 may be different between the first arm 55 and the second arm 56, and the position of the center of gravity of the pendulum 5J may be shifted from the rotation axis Rx.

Effects of Fourth Embodiment

The projector according to the embodiment described above has the following effects in addition to the same effects as those of the projector 1 according to the first embodiment.

The vibration generation device 3J includes the second induction unit 6H and the second driving unit 7H. The pendulum 5J includes the first arm 55 extending from the rotation axis Rx toward the first driving unit 7A side and the second arm 56 extending from the rotation axis Rx toward the side opposite from the first arm 55. The first induction unit 6A is provided at an opposite-side end portion of the first arm 55 from the rotation axis Rx and induces swing of the first arm 55, and the first driving unit 7A applies the driving force to the first arm 55. The second induction unit 6H includes the magnet 61A and is provided at an opposite-side end portion of the second arm 56 from the rotation axis Rx. The second induction unit 6H induces swing of the second arm 56. The second driving unit 7H includes the coil 73, faces the magnet 61A of the second induction unit 6H, and applies the driving force to the second arm 56. The coil 73 of the second driving unit 7H faces the magnet 61A of the second induction unit 6H in a non-contact manner.

According to such a configuration, the pendulum 5J including the first arm 55 and the second arm 56 can be swung like a seesaw. Therefore, the pendulum 5J can be stably swung. At this time, since the driving force for swinging the pendulum 5J can be applied to each of the first arm 55 and the second arm 56, the pendulum 5J can be stably swung.

In the vibration generation device 3J, the pendulum 5J includes the plate member 57 which is fixed to the base 4J and constitutes the rotation axis Rx.

According to such a configuration, the pendulum 5J can be swingably attached to the base 4J with a simple configuration. Therefore, a configuration of the vibration generation device 3J can be simplified.

Modification of Fourth Embodiment

In the vibration generation device 3J described above, the plate member 57 includes the pair of torsion portions 573 along the +X direction. That is, the pair of torsion portions 573 extend linearly along the +X direction. However, the pair of torsion portions 573 are not limited thereto, and may have another shape.

Figure 20:
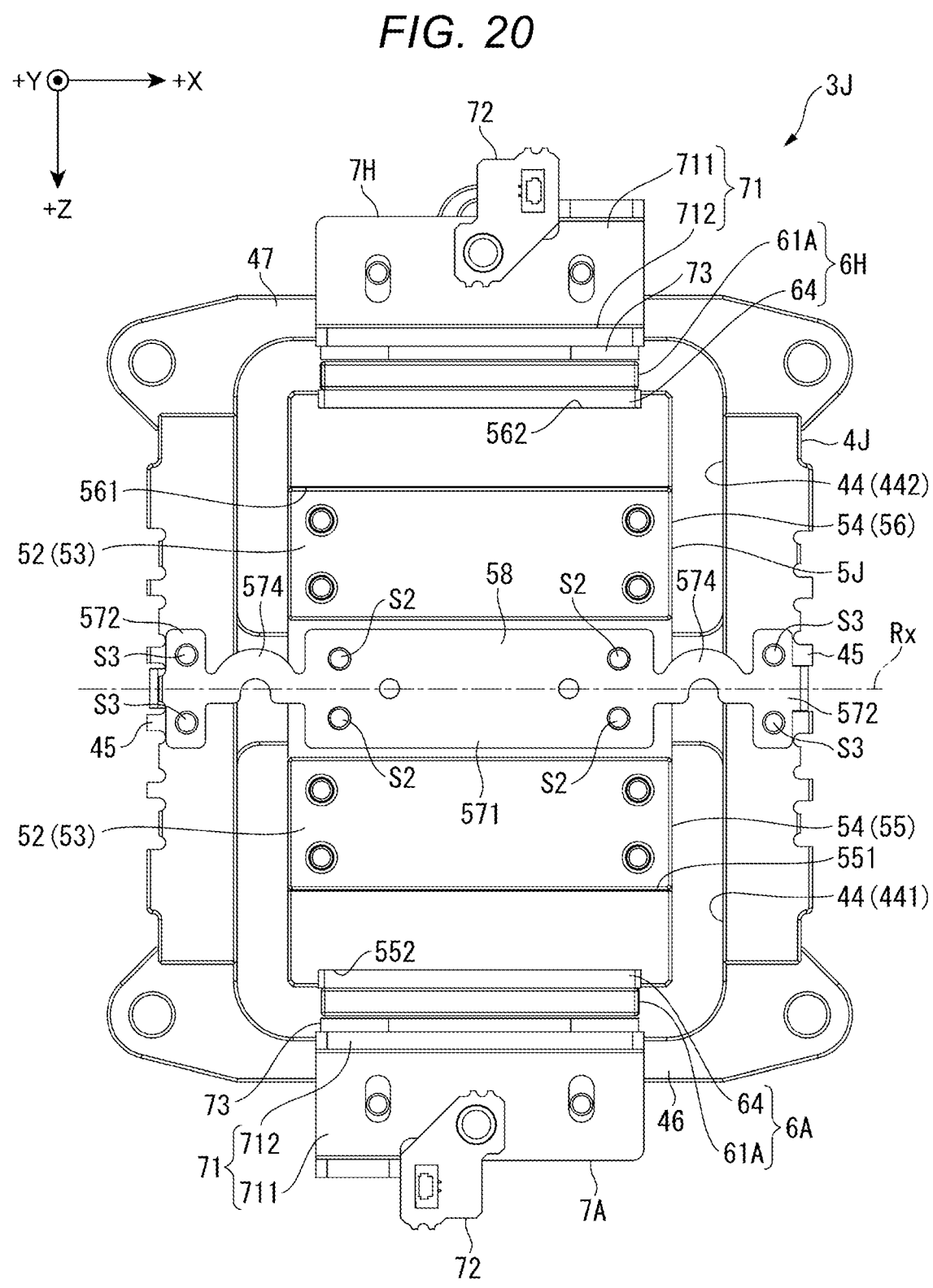
FIG. 20 is a view showing a vibration generation device according to a modification of the fourth embodiment.

FIG. 20 is a plan view showing a modification of the vibration generation device 3J. Specifically, FIG. 20 is a plan view showing a plate member 58 that is a deformation of the plate member 57 of the vibration generation device 3J.

For example, the vibration generation device 3J may use the plate member 58 shown in FIG. 20 instead of the plate member 57.

Similarly to the plate member 57, the plate member 58 is fixed to the pair of support portions 45 of the base 4J and constitutes the rotation axis Rx of the pendulum 5J. The plate member 58 has the same configuration and function as those of the plate member 57 except that the plate member 58 includes a pair of torsion portions 574 instead of the pair of torsion portions 573.

Similarly to the pair of torsion portions 573, the pair of torsion portions 574 are disposed between the fixing portion 571 and the pair of attachment portions 572. When the pendulum 5J is swung by the first driving unit 7A and the second driving unit 7H, the pair of torsion portions 574 are twisted around an axis along the +X direction, thereby enabling swing of the pendulum 5J. That is, an extension line of an axis coupling the pair of torsion portions 574 is the rotation axis Rx of the pendulum 5J.

Each of the pair of torsion portions 574 is formed in a substantially U shape that opens in the +Z direction when viewed from the +Y direction. By forming the pair of torsion portions 574 in such a shape, a strength of the pair of torsion portions 574 can be increased.

Other Modifications of Fourth Embodiment

The vibration generation device 3J described above includes the first induction unit 6A and the first driving unit 7A, and the second induction unit 6H and the second driving unit 7H. However, the vibration generation device 3J is not limited thereto, and may not include one of a set of the first induction unit 6A and the first driving unit 7A, and a set of the second induction unit 6H and the second driving unit 7H.

In addition, the vibration generation device 3J may use another first induction unit and another first driving unit described above instead of the first induction unit 6A and the first driving unit 7A. Similarly, the vibration generation device 3J may use a second induction unit and a second driving unit having the same configurations as those of another first induction unit and another first driving unit described above instead of the second induction unit 6H and the second driving unit 7H.

Modification of Embodiment

The present disclosure is not limited to the above-described embodiments, and modifications, improvements, and the like within a range in which an object of the present disclosure can be achieved are included in the present disclosure.

In the first to third embodiments and the modifications of the first to third embodiments, the pendulum 5A or 5C of the vibration generation device 3A, 3D, or 3H is swingably supported at the base 4A or 4C by the pair of support portions 41 provided at the base 4A or 4C. However, the pendulum 5A or 5C of the vibration generation device 3A, 3D, or 3H is not limited thereto, and may be supported by the plate member 57 or 58 at the base 4A or 4C swingably around the rotation axis Rx.

In the fourth embodiment and the modifications of the fourth embodiment, the pendulum 5J of the vibration generation device 3J is swingably supported at the base 4J by the plate member 57 or 58. However, the pendulum 5J is not limited thereto, and may be swingably supported at the base 4J by support portions similar to the pair of support portions 41 provided in the base 4A or 4C.

In the embodiments described above, the coil 73 or 76 of the first driving unit 7A or 7D is fixed to the base 4A, 4C, or 4J by the holding member 71 or 74. However, the coils 73 and 76 are not limited thereto, and may be fixed to a configuration other than the bases 4A, 4C, and 4J, for example, to the frame 23.

In the embodiments described above, examples in which the vibration reduction device 2 including the vibration generation device 3A, 3D, 3H, or 3J is applied to the projector 1 which is an electronic apparatus are described. However, the electronic apparatus to which the vibration reduction device 2 is applied is not limited to the projector, and may be applied to other electronic apparatuses.

In addition, the vibration generation device according to the present disclosure may be used alone as a device that generates vibration, or may be used in the electronic apparatus.

Summary of Present Disclosure

The present disclosure will be summarized as follows.

A vibration generation device according to a first aspect of the present disclosure includes: a base configured to transmit vibration to an object; a pendulum supported by the base swingably around a rotation axis; a first induction unit including a magnet, provided at an opposite-side end portion of the pendulum from the rotation axis, and configured to induce swing of the pendulum; and a first driving unit including a coil and configured to apply a driving force to the pendulum. The coil of the first driving unit faces the magnet of the first induction unit in a non-contact manner.

According to such a configuration, the magnet facing the coil in a non-contact manner and acting on a magnetic field generated by the coil is fixed to the pendulum. Accordingly, there is no need to provide, in the pendulum supported by the base swingably around the rotation axis, a wiring for supplying a current. Therefore, when the pendulum swings, a damage to the wiring for supplying the current to the coil can be prevented, and the pendulum can be reliably swung. Therefore, reliability of the vibration generation device can be improved.

In the first aspect, the vibration generation device may further include a control unit configured to alternately switch a direction of a current flowing through the coil of the first driving unit.

According to such a configuration, a direction of the magnetic field generated in the coil can be alternately reversed. Accordingly, the pendulum including the magnet can be swung. Therefore, vibration can be generated by the vibration generation device.

In the first aspect, the vibration generation device may further include a yoke disposed in at least one of a position on an opposite side of the coil of the first driving unit from the rotation axis and a position on a rotation axis side of the magnet of the first induction unit.

According to such a configuration, when the yoke is provided at the position on the opposite side of the coil from the rotation axis of the pendulum, a magnetic force generated in the coil can be directed to the magnet. Further, when the yoke is provided at the position on the rotation axis side of the magnet, an attraction force of the magnet can be increased. Therefore, since an interaction between the magnetic field generated by the coil and the magnet included in the pendulum can be strengthened, the current flowing through the coil for swinging the pendulum can be reduced.

In the first aspect, the yoke may include a first yoke provided at the position on the opposite side of the coil of the first driving unit from the rotation axis, and the first yoke may be a holding member provided at the base and holding the coil of the first driving unit.

According to such a configuration, since the first yoke functions as the holding member holding the coil of the first driving unit, there is no need to separately provide a member for fixing the coil to the base. Therefore, an increase in the number of components of the vibration generation device can be prevented.

In the first aspect, a center of gravity of the pendulum may be located closer to a first driving unit side than is an intermediate position between the rotation axis and an end portion of the pendulum on the first driving unit side.

According to such a configuration, since the center of gravity of the pendulum is set at the above-described position, a torque generated when the pendulum swings can be adjusted. Therefore, the vibration generated by the vibration generation device can be increased.

In the first aspect, the pendulum may include a disposition portion, at which a weight portion is disposed, at a position separated from the rotation axis toward a first driving unit side.

According to such a configuration, the torque generated when the pendulum swings can be increased by adjusting a weight of the weight portion provided at the disposition portion. Therefore, the vibration generated by the vibration generation device can be adjusted.

In the first aspect, the coil of the first driving unit may be an air-core coil having a longitudinal axis, and the magnet of the first induction unit may be disposed to face the coil of the first driving unit along the longitudinal axis.

According to such a configuration, since the coil used in the vibration generation device is the air-core coil, a cost of the coil can be reduced as compared with a coil having a core, and therefore a manufacturing cost of the vibration generation device can be reduced.

In addition, since the magnet is disposed along the longitudinal axis of the coil, the interaction between the magnetic field generated by the coil and the magnet can be increased.

In the first aspect, the coil of the first driving unit may include a first extending portion extending along the longitudinal axis and a second extending portion that extends along the longitudinal axis and through which a current flows in a direction opposite from that of the first extending portion, and a magnetic pole of a surface of the magnet of the first induction unit facing the first extending portion may be different from a magnetic pole of a surface of the magnet of the first induction unit facing the second extending portion.

According to such a configuration, the direction of the magnetic field generated by the coil is alternately changed, and therefore the pendulum to which the magnet is fixed can be reliably swung.

In the first aspect, the magnet of the first induction unit may include a first magnet member disposed to face the first extending portion, and a second magnet member disposed to face the second extending portion and disposed to be separated from the first magnet member in a direction from the first extending portion toward the second extending portion, and a magnetic pole of a surface of the first magnet member facing the first extending portion may be different from a magnetic pole of a surface of the second magnet member facing the second extending portion.

According to such a configuration, since the second magnet member facing the second extending portion is provided to be separated from the first magnet member in a direction from the first extending portion toward the second extending portion, the attraction force and a repulsive force of the magnet with respect to the magnetic field generated by the coil can be increased. Therefore, the torque when the pendulum swings can be increased.

In the first aspect, the first driving unit may include a first coil and a second coil as the coil of the first driving unit, the second coil may be disposed in parallel with the first coil in a direction along the rotation axis, and the magnet of the first induction unit may face the first coil and the second coil in a non-contact manner.

According to such a configuration, the magnetic field acting on the magnet provided at the pendulum can be increased. Therefore, the vibration generated by the swing of the pendulum can be increased.

In the first aspect, the first induction unit may include a first magnet and a second magnet as the magnet of the first induction unit, the first magnet may be disposed to face the first coil, and the second magnet may be disposed to be separated from and in parallel with the first magnet in the direction along the rotation axis and may be disposed to face the second coil.

According to such a configuration, the first magnet is provided to face the first coil, and the second magnet is provided to face the second coil. Accordingly, the torque when the pendulum including the first magnet and the second magnet swings can be increased. Therefore, the vibration generated by the swing of the pendulum can be increased.

In the first aspect, the vibration generation device may further include a second induction unit and a second driving unit. The pendulum may include a first arm extending from the rotation axis toward the first driving unit side, and a second arm extending from the rotation axis toward an opposite side from the first arm. The first induction unit may be provided at an opposite-side end portion of the first arm from the rotation axis, and induce swing of the first arm. The first driving unit may apply the driving force to the first arm. The second induction unit may include a magnet, may be provided at an opposite-side end portion of the second arm from the rotation axis, and induce swing of the second arm. The second driving unit may include a coil, face the magnet of the second induction unit, and apply the driving force to the second arm. The coil of the second driving unit may face the magnet of the second induction unit in a non-contact manner.

According to such a configuration, the pendulum including the first arm and the second arm can be swung like a seesaw. Therefore, the pendulum can be stably swung.

In the first aspect, the pendulum may include a plate member fixed to the base and constituting the rotation axis.

According to such a configuration, the pendulum can be swingably attached to the base with a simple configuration. Therefore, a configuration of the vibration generation device can be simplified.

In the first aspect, the base may include a relief portion configured to avoid contact with the pendulum.

According to such a configuration, noise due to the contact of the pendulum with the base can be prevented from occurring when the pendulum swings. Therefore, a sound of the vibration generation device can be reduced.

A vibration reduction device according to a second aspect of the present disclosure includes: the vibration generation device according to the first aspect; a detection unit configured to detect vibration; and an operation control unit configured to cause the vibration generation device to generate vibration opposite in phase from the vibration detected by the detection unit.

According to such a configuration, the same effects as those of the vibration generation device according to the first aspect can be achieved. Further, since the vibration generation device can generate the vibration opposite in phase from the vibration detected by the detection unit, the vibration of an installation target of the vibration reduction device can be reduced.

An electronic apparatus according to a third aspect of the present disclosure includes the vibration reduction device according to the second aspect.

According to such a configuration, the same effects as those of the vibration reduction device according to the second aspect can be achieved, and the vibration of the electronic apparatus can be reduced.

In the third aspect, the electronic apparatus may further include a projection optical device configured to project an image. The vibration reduction device may be attached to the projection optical device.

According to such a configuration, the vibration of the projection optical device caused by an internal factor of the electronic apparatus or an external factor to the electronic apparatus can be reduced. Therefore, an image projected onto a projection surface by the projection optical device can be prevented from shaking.

What is claimed is:

1. A vibration generation device comprising:
a base configured to transmit vibration to an object;
a pendulum supported by the base swingably around a rotation axis;
a first induction unit including a magnet, provided at an opposite-side end portion of the pendulum from the rotation axis, and configured to induce swing of the pendulum; and
a first driving unit including a coil and configured to apply a driving force to the pendulum, wherein
the coil of the first driving unit faces the magnet of the first induction unit in a non-contact manner;
the first driving unit includes a first coil and a second coil as the coil of the first driving unit,
the second coil is disposed in parallel with the first coil in a direction along the rotation axis, and
the magnet of the first induction unit faces the first coil and the second coil in a non-contact manner.

2. The vibration generation device according to claim 1, further comprising:
a control unit configured to alternately switch a direction of a current flowing through the coil of the first driving unit.

3. The vibration generation device according to claim 1, further comprising:
a yoke disposed in at least one of a position on an opposite side of the coil of the first driving unit from the rotation axis and a position on a rotation axis side of the magnet of the first induction unit.

4. The vibration generation device according to claim 3, wherein
the yoke includes a first yoke provided at the position on the opposite side of the coil of the first driving unit from the rotation axis, and
the first yoke is a holding member provided at the base and holding the coil of the first driving unit.

5. The vibration generation device according to claim 1, wherein a center of gravity of the pendulum is located closer to the first driving unit side than is an intermediate position between the rotation axis and an end portion of the pendulum on the first driving unit side.

6. The vibration generation device according to claim 1, wherein the pendulum includes a disposition portion, at which a weight portion is disposed, at a position separated from the rotation axis toward the first driving unit side.

7. The vibration generation device according to claim 1, wherein the coil of the first driving unit is an air-core coil having a longitudinal axis, and the magnet of the first induction unit is disposed to face the coil of the first driving unit along the longitudinal axis.

8. The vibration generation device according to claim 7, wherein the coil of the first driving unit includes a first extending portion extending along the longitudinal axis, and a second extending portion that extends along the longitudinal axis and through which a current flows in a direction opposite from that of the first extending portion, and a magnetic pole of a surface of the magnet of the first induction unit facing the first extending portion is different from a magnetic pole of a surface of the magnet of the first induction unit facing the second extending portion.

9. The vibration generation device according to claim 8, wherein the magnet of the first induction unit includes a first magnet member disposed to face the first extending portion, and a second magnet member disposed to face the second extending portion and disposed to be separated from the first magnet member in a direction from the first extending portion toward the second extending portion, and a magnetic pole of a surface of the first magnet member facing the first extending portion is different from a magnetic pole of a surface of the second magnet member facing the second extending portion.

10. The vibration generation device according to claim 1, wherein the first induction unit includes a first magnet and a second magnet as the magnet of the first induction unit, the first magnet is disposed to face the first coil, and the second magnet is disposed to be separated from and in parallel with the first magnet in the direction along the rotation axis and is disposed to face the second coil.

11. The vibration generation device according to claim 1, further comprising:

a second induction unit; and a second driving unit, wherein the pendulum includes a first arm extending from the rotation axis toward the first driving unit side, and a second arm extending from the rotation axis toward an opposite side from the first arm, the first induction unit is provided at an opposite-side end portion of the first arm from the rotation axis, and induces swing of the first arm, the first driving unit applies a driving force to the first arm, the second induction unit includes a magnet, is provided at an opposite-side end portion of the second arm from the rotation axis, and induces swing of the second arm, the second driving unit includes a coil, faces the magnet of the second induction unit, and applies a driving force to the second arm, and the coil of the second driving unit faces the magnet of the second induction unit in a non-contact manner.

12. The vibration generation device according to claim 1, wherein the pendulum includes a plate member fixed to the base and constituting the rotation axis.

13. The vibration generation device according to claim 1, wherein the base includes a relief portion configured to avoid contact with the pendulum.

14. A vibration reduction device comprising:

the vibration generation device according to claim 1;

a detection unit configured to detect vibration; and an operation control unit configured to cause the vibration generation device to generate vibration opposite in phase from the vibration detected by the detection unit.

15. An electronic apparatus comprising:

the vibration reduction device according to claim 14.

16. The electronic apparatus according to claim 15, further comprising:

a projection optical device configured to project an image, wherein the vibration reduction device is attached to the projection optical device.

17. A vibration generation device comprising:

a base configured to transmit vibration to an object;

a pendulum supported by the base swingably around a rotation axis, wherein the pendulum includes a first arm and a second arm;

a first induction unit including a magnet, provided at an opposite-side end portion of the first arm from the rotation axis, and configured to induce swing of the pendulum;

a second induction unit provided at an opposite-side end portion of the second arm from the rotation axis; and a first driving unit including a coil and configured to apply a driving force to the pendulum, wherein the coil of the first driving unit faces the magnet of the first induction unit in a non-contact manner;

the first arm of the pendulum extends from the rotation axis toward the first driving unit side, and the second arm of the pendulum extends from the rotation axis toward an opposite side from the first arm.

18. The vibration generation device according to claim 17, further comprising:

a control unit configured to alternately switch a direction of a current flowing through the coil of the first driving unit.

19. The vibration generation device according to claim 17, further comprising:

a yoke disposed in at least one of a position on an opposite side of the coil of the first driving unit from the rotation axis and a position on a rotation axis side of the magnet of the first induction unit.

20. The vibration generation device according to claim 19, wherein the yoke includes a first yoke provided at the position on the opposite side of the coil of the first driving unit from the rotation axis, and the first yoke is a holding member provided at the base and holding the coil of the first driving unit.

\* \* \* \* \*